United States Patent
Zhu et al.

(10) Patent No.: US 11,265,218 B2
(45) Date of Patent: Mar. 1, 2022

(54) CONFIGURATION MANAGEMENT METHOD AND APPARATUS, AND DEVICE

(71) Applicant: Huawei Technologies Co., Ltd., Shenzhen (CN)

(72) Inventors: Hongze Zhu, Shenzhen (CN); Xin Lei, Shenzhen (CN); Jianqing Liu, Dongguan (CN); Weiming Liao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 101 days.

(21) Appl. No.: 16/786,598

(22) Filed: Feb. 10, 2020

(65) Prior Publication Data
US 2020/0177461 A1    Jun. 4, 2020

Related U.S. Application Data

(63) Continuation of application No. PCT/CN2018/095631, filed on Jul. 13, 2018.

(30) Foreign Application Priority Data

Aug. 11, 2017    (CN) .......................... 201710684907.8

(51) Int. Cl.
*H04L 12/24* (2006.01)
*G06F 16/2455* (2019.01)
(Continued)

(52) U.S. Cl.
CPC .......... *H04L 41/0893* (2013.01); *G06F 9/546* (2013.01); *G06F 16/2455* (2019.01); *H04L 12/66* (2013.01); *H04L 69/22* (2013.01)

(58) Field of Classification Search
CPC ...... G06F 9/546; G06F 15/16; G06F 16/2455; G06F 9/542; H04L 41/0893;
(Continued)

(56) References Cited

U.S. PATENT DOCUMENTS 9,047,589 B2 *    6/2015    Gallant .................. H04L 51/04
10,237,303 B2 *    3/2019    Simone, Jr. ............ H04L 63/20
(Continued)

FOREIGN PATENT DOCUMENTS

CN    102640137 A    8/2012
CN    103946804 A    7/2014
(Continued)

OTHER PUBLICATIONS

International Standard, 1SO/IEC 20922;Information technology—Message,Queuing Telemetry Transport (MQTT),v3.1.1,Jun. 15, 2016, 86 pages.

*Primary Examiner* — Ninos Donabed
(74) *Attorney, Agent, or Firm* — Conley Rose, P.C.

(57) ABSTRACT

The present disclosure disclose a configuration management method and apparatus, and a device. A control device determines that an application message needs to be published to a target logical group. The control device obtains an identifier of the target logical group and queries, according to a gateway mapping table and the identifier of the target logical group, a gateway connected to each of the at least one target terminal, to obtain at least one target gateway. The control device generates based on the application message, a MQTT publish packet and sends the MQTT publish packet to the at least one target gateway, where the MQTT publish packet is used to instruct a target gateway that receives the MQTT publish packet to send a corresponding application message to each target terminal that is connected to the target gateway and that belongs to the target logical group.

16 Claims, 6 Drawing Sheets

(51) Int. Cl.
*G06F 9/54* (2006.01)
*H04L 12/66* (2006.01)
*H04L 29/06* (2006.01)
*H04L 41/0893* (2022.01)
*H04L 69/22* (2022.01)

(58) Field of Classification Search
CPC ..... H04L 41/0889; H04L 67/12; H04L 67/26; H04L 69/22; H04L 41/08; H04L 12/66; H04Q 9/00
See application file for complete search history.

(56) References Cited

U.S. PATENT DOCUMENTS

| | | | | |
|---|---|---|---|---|
| 11,076,003 B2* | 7/2021 | Smith | .................... | H04L 67/16 |
| 11,128,726 B2* | 9/2021 | Eckhardt | ............ | G05B 19/4186 |
| 2005/0021622 A1 | 1/2005 | Cullen | | |
| 2008/0133541 A1 | 6/2008 | Fletcher et al. | | |
| 2014/0286354 A1 | 9/2014 | Van de Poel et al. | | |
| 2015/0067021 A1* | 3/2015 | Protas | .................... | G16H 40/67 |
| | | | | 709/202 |
| 2015/0256490 A1 | 9/2015 | Gallant et al. | | |
| 2016/0205138 A1* | 7/2016 | Krishnaprasad | ........ | H04L 63/14 |
| | | | | 726/1 |
| 2016/0212225 A1* | 7/2016 | Smith | .................... | H04L 41/20 |
| 2016/0212239 A1* | 7/2016 | Das | ........................ | G06F 21/55 |
| 2016/0219063 A1* | 7/2016 | Nadkarni | ................ | H04L 67/42 |
| 2016/0319826 A1* | 11/2016 | Shanks | ................ | F04D 15/0088 |
| 2016/0381699 A1* | 12/2016 | Rubin | ................ | H04L 67/2809 |
| | | | | 370/329 |
| 2017/0104792 A1* | 4/2017 | Sanjeev | ............... | H04L 65/1069 |
| 2017/0303112 A1* | 10/2017 | Hsu | ...................... | H04L 61/2038 |
| 2018/0060159 A1* | 3/2018 | Justin | .................. | G06F 11/0787 |
| 2018/0062919 A1* | 3/2018 | Justin | .................. | H04L 43/087 |
| 2018/0062959 A1* | 3/2018 | Justin | ...................... | A61B 5/01 |
| 2018/0063250 A1* | 3/2018 | Justin | .................... | H04L 67/125 |
| 2018/0167476 A1* | 6/2018 | Hoffner | .................. | H04L 67/26 |
| 2018/0248804 A1* | 8/2018 | Nandy | ................ | H04L 67/1002 |
| 2018/0270310 A1* | 9/2018 | Venkatesan | ......... | H04L 12/2836 |
| 2019/0182119 A1* | 6/2019 | Ratkovic | ............... | H04L 43/045 |
| 2019/0215694 A1* | 7/2019 | Rubin | .................. | H04W 4/90 |

FOREIGN PATENT DOCUMENTS

| | | |
|---|---|---|
| CN | 104836723 A | 8/2015 |
| WO | 2004072800 A2 | 8/2004 |

* cited by examiner

CONFIGURATION MANAGEMENT METHOD AND APPARATUS, AND DEVICE

CROSS-REFERENCE TO RELATED APPLICATIONS

This application is a continuation of International Application No. PCT/CN2018/095631, filed on Jul. 13, 2018, which claims priority to Chinese Patent Application No. 201710684907.8, filed on Aug. 11, 2017, both of which are incorporated herein by reference in their entireties.

TECHNICAL FIELD

This application relates to the field of computer technologies, and in particular, to a configuration management method and apparatus, and a device.

BACKGROUND

By interacting with massive network access devices, a control device may manage the massive network access devices or provide various services for the massive network access devices. Management of the massive network access devices by the control device may include device configuration management, device performance management, device fault management, application deployment management, virtual machine deployment management, radio calibration, terminal location analysis, user access control, mobile operation and management, and the like. The services that the control device may provide for the massive network access devices include network services such as Wi-Fi access, data exchange, and network security. In addition, the control device may provide data-level services such as collection and storage of system logs and performance indicator data. Further, the control device may provide application-level services, for example, provide an application analysis report with an industry attribute for public running businesses, so as to meet diverse device management and service requirements of users.

However, because efficiency of publishing an application message by the control device to the massive network access devices is relatively low, device management and quality of service are adversely affected. For example, when the control device sends configuration update messages to a plurality of network access devices, the network access devices are unable to update configuration information in time because of a slow sending speed, and consequently, the network access devices cannot interact with other devices. Therefore, how to improve the efficiency of publishing an application message by the control device to the massive network access devices is a problem in the current computer network field that needs to be urgently resolved.

SUMMARY

The present disclosure provides a configuration management method and apparatus, and a device, so as to send messages on a grouping basis, to improve efficiency of publishing an application message by a control device to massive network access devices.

According to a first aspect, an embodiment of the present disclosure provides a configuration management method. The control device determines that an application message needs to be published to a target logical group, obtains an identifier of the target logical group, queries, according to a gateway mapping table and the identifier of the target logical group, a gateway connected to each target terminal in the target logical group, to obtain at least one target gateway. The control device generates an MQTT publish packet based on the application message; and sends the MQTT publish packet to the at least one target gateway, where the MQTT publish packet is used to indicate a target gateway that receives the MQTT publish packet to send a corresponding application message to each target terminal that is connected to the target gateway and that belongs to the target logical group.

The target logical group includes at least one target terminal.

The gateway mapping table records identifiers of a plurality of gateways, an identifier of a terminal connected to each of the plurality of gateways, and an identifier of a logical group to which each terminal belongs.

The MQTT publish packet includes the identifier of the target logical group and the application message.

In this technical solution, the control device may send, on a grouping basis, the MQTT publish packet that includes the application message to the gateway connected to the terminals in the group, and instruct the gateway to send the application message to each terminal, so as to improve message sending efficiency. When a subscription/publication mechanism of the MQTT protocol is used between the control device and the terminal, a persistent connection between the control device and the terminal is not required, and the control device may be connected to the plurality of gateways in a cascading manner, so that a quantity of accessed terminals may be increased exponentially.

In a possible implementation, the control device receives an MQTT subscribe packet that carries a subscription topic, and parses the MQTT subscribe packet to obtain flag data. If the flag data includes a subscription flag and an identifier of a gateway, the control device determines that the subscription topic is subscribed to by the gateway, and records the identifier of the gateway in the gateway mapping table; or if the flag data includes a forwarding flag, an identifier of a terminal, and an identifier of a gateway, the control device determines that the subscription topic is subscribed to by the terminal, determines that the terminal is connected to the gateway, and records the identifier of the terminal in an entry corresponding to the identifier of the gateway in the gateway mapping table.

In this technical solution, the control device may parse the MQTT subscribe packet to obtain the flag data, and may determine a connection relationship between the gateway and the terminal based on the flag data, or determine a connection relationship between the control device and the gateway, that is, the control device may determine a path used for sending the application message to the terminal, and may support the gateway in subscribing to a topic or forwarding the subscription topic, so that the subscription mechanism is more flexible.

In a possible implementation, the control device groups a plurality of terminals connected to the plurality of gateways based on subscription topics of the plurality of terminals, or randomly groups the plurality of terminals, or groups the plurality of terminals based on the plurality of gateways, to obtain a plurality of logical groups. The control device sets an identifier for each logical group, and records the identifier of each logical group in an entry corresponding to an identifier of each terminal in the logical group in the gateway mapping table.

In this technical solution, the control device may group, based on the subscription topics of the terminals, or based on the gateways, or randomly, the terminals connected to the plurality of gateways, and may flexibly group the terminals, so that the control device may send the application message to each terminal on a grouping basis, thereby improving message sending efficiency.

In a possible implementation, if the control device detects at least one application message that matches the subscription topic of the at least one target terminal in the target logical group, or if the control device detects at least one application message that matches historical behavior data of the at least one target terminal, the control device determines that the application message needs to be published to the target logical group.

In this technical solution, the control device may determine, based on the subscription topic of each terminal in the target logical group or the historical behavior data of each terminal, whether the application message needs to be published to each target terminal in the target logical group.

In a possible implementation, the control device generates a variable header in an MQTT format based on the identifier of the target logical group, generates a payload in the MQTT format based on the application message, and encapsulates the variable header and the payload into the MQTT publish packet.

In this technical solution, the control device may encapsulate the identifier of the target logical group and the at least one application message into the MQTT publish packet, so that the gateway may send the application message to each target terminal based on the MQTT publish packet.

According to a second aspect, another configuration management method is provided, and the method is applied to a gateway and includes: a gateway receives a first Message Queuing Telemetry Transport MQTT publish packet sent by a control device, and parses the first MQTT publish packet to obtain an identifier of a target logical group and at least one application message. The gateway determines, based on a grouping mapping table and the identifier of the target logical group, at least one target terminal that is connected to the gateway and that belongs to the target logical group, and a subscription topic or historical behavior data of each of the at least one target terminal. The gateway determines, from the at least one application message, a target application message that matches the historical behavior data or the subscription topic of each of the at least one target terminal, generates a second MQTT publish packet based on the target application message, and sends, to the target terminal, the second MQTT publish packet that carries the target application message.

The grouping mapping table records an identifier of each terminal connected to the gateway, an identifier of a logical group to which each terminal belongs, and a subscription topic or historical behavior data of each terminal.

In this technical solution, the gateway may receive the MQTT publish packets that are sent by the control device on a grouping basis, and send the application messages in the MQTT publish packet to the terminals in the group, so as to improve efficiency of publishing the application message by the control device to massive network access devices.

In a possible implementation, the gateway receives a subscription request of a terminal, parses the subscription request to obtain an identifier of the terminal and a subscription topic of the terminal, and then determines that the terminal is connected to the gateway. The gateway records the identifier of the terminal and the subscription topic of the terminal in an entry of the grouping mapping table and receives a grouping message sent by the control device. The gateway records, in the grouping mapping table, the identifier that is included in the grouping message and that is of the logical group to which the terminal belongs in an entry corresponding to the identifier of the terminal.

The grouping message includes the identifier of the terminal and the identifier of the logical group to which the terminal belongs.

In this technical solution, the gateway may determine, based on a subscription request of a terminal, each terminal connected to the gateway, and may determine, based on the grouping message sent by the control device, the identifier of the logical group to which the terminal belongs, so that the gateway may determine a path used for sending a message to each terminal in the group.

In a possible implementation, the gateway obtains historical behavior data of the terminal, and records the historical behavior data of the terminal in the entry corresponding to the identifier of the terminal in the grouping mapping table.

In this technical solution, the gateway may obtain the historical behavior data of each terminal, and record the historical behavior data of the terminals in the grouping mapping table, so that when receiving the application message that matches the historical behavior data of the terminal, the gateway may send the application message to the terminal.

In a possible implementation, the gateway generates a variable header in an MQTT format based on the identifier of the terminal and an identifier of the gateway, generate a payload in the MQTT format based on the subscription topic of the terminal, and generate a fixed header in the MQTT format based on a forwarding flag. The gateway may encapsulate the variable header, the payload, and the fixed header into an MQTT subscribe packet, and send the MQTT subscribe packet to the control device. The MQTT subscribe packet is used to instruct the control device to determine that the subscription topic is subscribed to by the terminal, determine that the terminal is connected to the gateway, and record the identifier of the terminal in an entry corresponding to the identifier of the gateway in a gateway mapping table of the control device.

In this technical solution, the gateway may forward a subscription request of a terminal connected to the gateway, so that the control device can not only determine, based on the subscription request, a path used for sending the application message to each terminal, but also support the gateway in forwarding the subscription topic, thereby enhancing flexibility of a subscription mechanism.

In a possible implementation, the gateway generates a variable header in the MQTT format based on the identifier of the gateway, generate a payload in the MQTT format based on the subscription topic of the gateway, and generate a fixed header in the MQTT format based on a subscription flag. The gateway may encapsulate the variable header, the payload, and the fixed header into the MQTT subscribe packet, and send the MQTT subscribe packet to the control device. The MQTT subscribe packet is used to instruct the control device to determine that the subscription topic is subscribed to by the gateway, and record the identifier of the gateway in the gateway mapping table of the control device.

In this technical solution, the gateway may send the subscription request to the control device to support the gateway in subscribing to a topic, thereby enhancing flexibility of the subscription mechanism.

According to a third aspect, a configuration management apparatus is provided, and the configuration management apparatus is applied to a control device and has a corresponding function of implementing the first aspect or the possible implementations of the first aspect. The function may be implemented by hardware, or may be implemented by hardware by executing corresponding software. The hardware or the software includes one or more modules corresponding to the foregoing function. The module may be software and/or hardware.

According to a fourth aspect, another configuration management apparatus is provided, and the configuration management apparatus is applied to a gateway and has a corresponding function of implementing the second aspect or the possible implementations of the second aspect. The function may be implemented by hardware, or may be implemented by hardware by executing corresponding software. The hardware or the software includes one or more modules corresponding to the foregoing function. The module may be software and/or hardware.

According to a fifth aspect, a control device is provided, and the control device includes: a memory, configured to store one or more programs; and a processor, configured to invoke the programs stored in the memory to implement the solution in the method design of the first aspect.

According to a sixth aspect, a gateway is provided, and the gateway includes: a memory, configured to store one or more programs; and a processor, configured to invoke the programs stored in the memory to implement the solution in the method design of the second aspect.

According to a seventh aspect, a computer readable storage medium is provided, and the computer readable storage medium stores a computer program; and when executed by at least one processor, the computer program may implement the first aspect, the second aspect, and the possible implementations and beneficial effects of the first aspect and the second aspect.

According to an eighth aspect, an embodiment of the present disclosure provides a computer program product, and the computer program product includes a non-volatile computer readable storage medium that stores a computer program; and when the computer program is executed, the computer is enabled to perform the steps of the method of the first aspect and the second aspect. For implementations and beneficial effects of resolving a problem by the computer program product, reference may be made to the implementations and the beneficial effects of the first aspect, second aspect, and the possible methods of the first aspect and the second aspect, and details are not described herein again.

BRIEF DESCRIPTION OF DRAWINGS

To describe the technical solutions in the embodiments of the present disclosure more clearly, the following describes accompanying drawings required for describing the embodiments of the present disclosure.

DESCRIPTION OF EMBODIMENTS

The following describes the embodiments of the present disclosure with reference to the accompanying drawings in the embodiments of the present disclosure.

By interacting with massive network access devices, a control device may manage the massive network access devices or provide various services for the massive network access devices, for example, implement configuration management of the devices or provide a data exchange service. However, because efficiency of publishing an application message by the control device to the massive network access devices is relatively low, device management and Quality of Service are adversely affected. Based on this, the present disclosure provides a configuration management method and apparatus, and a device, so as to enable the control device to send messages to the network access devices on a grouping basis, to improve message sending efficiency.

The present disclosure may be applied to application scenarios such as telemetry, vehicle monitoring, smart household, energy monitoring, chat application, smart metering, notification service, and health care, so as to manage terminals or provide services for terminals in the application scenarios.

The control device in the embodiments of the present disclosure may refer to a server applied to various application scenarios, and the terminal may refer to a terminal applied to various application scenarios. For example, in the vehicle monitoring application scenario, the control device may refer to a vehicle monitoring server, and the terminal may refer to a vehicle terminal; or in the smart metering application scenario, the control device may refer to a power metering server, and the terminal may refer to a smart meter. In addition, the control device may be applied to a plurality of application scenarios, and the terminal may also be applied to a plurality of application scenarios.

The gateway in the embodiments of the present disclosure may refer to an access router (AR).

In the specification, claims, and the accompanying drawings of the present disclosure, the foregoing terms "first", "second", and the like are intended to distinguish between different objects but do not indicate a particular order.

To better understand a configuration management method and apparatus, and a device provided in the embodiments of the present disclosure, the following first describes a network architecture in the embodiments of the present disclosure.

Figure 1:
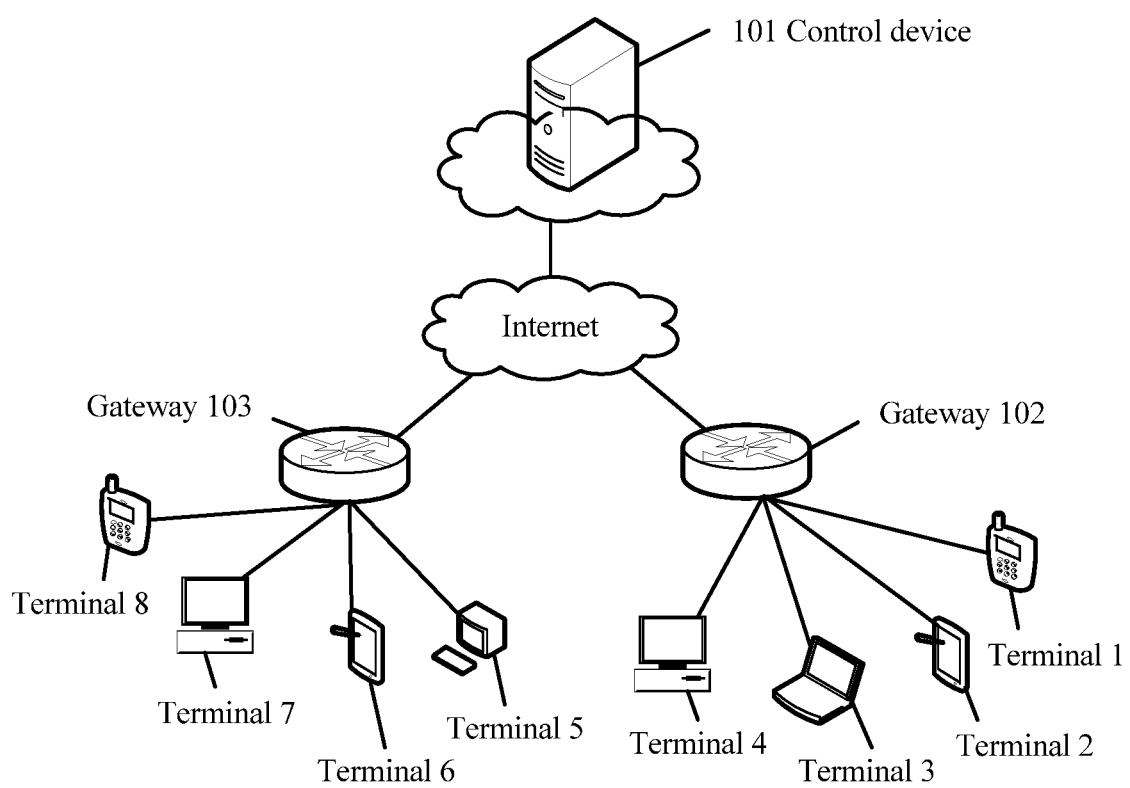
FIG. 1 is a schematic diagram of a network architecture for configuration management according to an embodiment of the present disclosure.

FIG. 1 is a schematic diagram of a network architecture for configuration management according to an embodiment of the present disclosure. The network architecture for configuration management shown in FIG. 1 may include a control device 101 and one or more gateways (FIG. 1 shows two gateways that are respectively denoted as a gateway 102 and a gateway 103). The control device 101 may be deployed in cloud and connected to the gateway 102 and the gateway 103 respectively by using the public Internet. The gateway is capable of converting an IP address of the public network to an IP address of a private network, or converting an IP address of the private network to an IP address of the public network. Therefore, a terminal 1, a terminal 2, a terminal 3, and a terminal 4 distributed in the private network may be connected to the Internet by using the gateway 102. Likewise, a terminal 5, a terminal 6, a terminal 7, and a terminal 8 distributed in the private network may be connected to the Internet by using the gateway 103. Based on the network architecture shown in FIG. 1, a subscription request may be sent and an application message may be published, so as to manage terminals or provide services for terminals.

Specifically, the gateway 102 or the gateway 103 may send, to the control device 101, a subscription request that carries a subscription flag, and the subscription request includes a subscription topic. After receiving the subscription request that carries the subscription flag, the control device 101 parses the subscription request. If the subscription flag is obtained and an identifier of the gateway is 102, it may be determined that the gateway 102 is connected to the control device 101. Likewise, if the subscription flag is obtained and the identifier of the gateway is 103, it may be determined that the gateway 103 is connected to the control device 101. The terminal 1 may send a subscription request to the gateway 102, where the subscription request includes a subscription topic and an identifier of the terminal. After receiving the subscription request, the gateway 102 parses the subscription request; and if the obtained identifier of the terminal is 1, it may be determined that the terminal 1 is connected to the gateway 102. The gateway 102 may encapsulate the subscription request into a subscription request that carries a forwarding flag, and forward the subscription request that carries the forwarding flag to the control device 101. After receiving the subscription request, the control device 101 parses the subscription request to obtain the forwarding flag, the subscription topic, the identifier 102 of the gateway, and the identifier 1 of the terminal, so that it may be determined that the subscription topic is subscribed to by the terminal 1, and the terminal 1 is connected to the gateway 102. Likewise, the control device 101 may determine that the terminal 2 to the terminal 4 are connected to the gateway 102. In other words, when publishing an application message to the terminal 1 to the terminal 4, the control device 101 needs to send the application message to the gateway 102, and the gateway 102 forwards the application message to the terminal 1 to the terminal 4. Likewise, the control device 101 may determine, by parsing the subscription requests forwarded by the received gateway 103 to the terminal 5 to the terminal 8, that the terminal 5 to the terminal 8 are connected to the gateway 103.

The control device may group the terminals connected to each gateway to obtain a plurality of logical groups, and set an identifier for each logical group, and may send, to the gateway 102 and the gateway 103, a grouping message that carries the identifier of the logical group and an identifier of the terminal included in each logical group, so that the gateway 102 determines an identifier of a logical group to which the terminal 1, the terminal 2, the terminal 3, and the terminal 4 respectively belong, and the gateway 103 determines an identifier of a logical group to which the terminal 5, the terminal 6, the terminal 7, and the terminal 8 respectively belong.

The foregoing logical group may be obtained by grouping each terminal based on a subscription topic of each terminal or the gateway, or in a random manner. For example, the control device may classify terminals that have a same subscription topic into one logical group. For example, the control device may classify the terminal 2 to the terminal 8 into a first logical group, where an identifier of the first logical group is 1, classify the terminal 1 into a second logical group, where an identifier of the second logical group is 2, and may separately send the grouping message that carries the identifier of the logical group to which each terminal belongs and the identifier of each terminal to the gateway 102 and the gateway 103, so that the gateway 102 may determine and record, in a grouping mapping table of the gateway 102, that the identifier of the logical group to which the terminal 2 to the terminal 4 belong is 1, and the identifier of the logical group to which the terminal 1 belongs is 2, and the gateway 103 may determine and record, in a grouping mapping table of the gateway 103, that the identifier of the logical group to which the terminal 5 to terminal 8 belong is 1.

When the application message needs to be published to the target logical group, for example, if the identifier of the target logical group is 1, the control device may query, by using the foregoing determined connection relationship between the terminal and the gateway, that the gateways connected to the terminals in the first logical group are the gateway 102 and the gateway 103 respectively, and then may separately send, to the gateway 102 and the gateway 103, an MQTT publish packet that carries the identifier of the logical group, where the MQTT publish packet sent by the control device to the gateway 102 includes at least one application message that matches the subscription topics of the terminal 2 to the terminal 4, and the MQTT publish packet sent by the control device to the gateway 103 includes at least one application message that matches the subscription topics of the terminal 5 to the terminal 8.

After receiving the MQTT publish packet, the gateway 102 may parse the MQTT publish packet to obtain the identifier of the logical group and at least one application message, determine, based on the foregoing grouping mapping table, that the application message needs to be sent to the terminal 2 to the terminal 4; and then separately determine, from the at least one application message, the application message that matches the subscription topic of each terminal, and separately send determined application messages to the terminal 2 to the terminal 4.

Likewise, after receiving the MQTT publish packet, the gateway 103 may parse the MQTT publish packet to obtain the identifier of the logical group and at least one application message; determine, based on the foregoing grouping mapping table, that the application message needs to be sent to the terminal 5 to the terminal 8; and then separately determine, from the at least one application message, the application message that matches the subscription topic of each terminal, and separately send determined application messages to the terminal 5 to the terminal 8.

It should be noted that the gateway 102 or the gateway 103 in the network architecture may be configured to forward the subscription request of the terminal or forward the application message published by the control device 101 to a terminal connected to the gateway 102 or the gateway 103. Therefore, the gateway 102 and the gateway 103 may be considered as MQTT brokers in an MQTT mechanism, the control device 101 may be considered as a publisher for publishing messages in the MQTT mechanism, and each terminal may be considered as a subscriber in the MQTT mechanism.

It should be noted that the MQTT publish packet and the subscription request are transmitted based on the MQTT protocol. The Message Queuing Telemetry Transport (MQTT) protocol is an instant messaging protocol. The protocol has the following advantages: 1) Reliable transmission: The MQTT protocol may ensure reliable and secure message transmission and may be easily integrated with a business application; 2) Message push: real-time message notification, rich push content, flexible subscription/publication, and message storage and filtering; and 3) Low bandwidth, low energy consumption, and low costs: low bandwidth of a mobile application is occupied, bandwidth utilization is high, and power consumption is low. Therefore, the protocol is widely used in application scenarios such as telemetry, automobile, smart household, energy monitoring, chat application, notification service, and health care.

When working with a broker, the MQTT protocol can be used to implement a publishing/subscription mechanism. In a publishing or subscription process, a publisher (for example, a control device) or a subscriber (for example, a terminal) do not need to know existence of each other, and the publisher and the subscriber only need to know existence of the broker (for example, a gateway) and can interact directly with the broker. The broker forwards a subscribed or published message to the publisher or the subscriber.

The publishing or subscription mechanism of the MQTT protocol may completely decouple the publisher and the subscriber from the following three aspects: 1) space decoupling: The publisher and the subscriber do not need to know about the existence of each other (the publisher and the subscriber can communicate with the broker by using an IP address and a port); 2) time decoupling: The subscriber and the publisher do not have to connect to the broker at the same time; 3) synchronous decoupling: When a message is published or received, components on the subscriber and the publisher synchronously operate. The complete decoupling based on the foregoing three aspects makes it easier for the subscriber to interact with the publisher.

In the publishing or subscription mechanism of the MQTT protocol, the subscriber interacts with the publisher by primarily using an MQTT subscribe packet and an MQTT publish packet.

The MQTT subscribe packet is a type of message that is sent by a subscriber to a publisher to create one or more subscriptions, and each MQTT subscribe packet carries one or more subscription topics of interest to which subscriber subscribes from the publisher. If the publisher publishes a message that matches a topic to which the subscriber subscribes, the publisher may send the message that matches the subscription topic of the subscriber to the subscriber.

TABLE 1

| Fixed header of an MQTT subscribe packet | | | | | | | | |
|---|---|---|---|---|---|---|---|---|
| Bit | 7 | 6 | 5 | 4 | 3 | 2 | 1 | 0 |
| Byte 1 | MQTT control packet type | | | | Reserved bits | | | |
| | 1 | 0 | 0 | 0 | | | | |
| Byte 1 | Remaining length | | | | | | | |

The MQTT subscribe packet includes three parts: a fixed header, a variable header, and a payload. As shown in Table 1, the fixed header of the MQTT subscribe packet includes the following fields: MQTT control packet type, reserved bits, and remaining length. A value of the "MQTT control packet type" field is used to describe a type of an MQTT packet; and if the value is 8, it indicates that the MQTT packet is an MQTT subscribe packet. The "remaining length" field is used to indicate a total quantity of bytes of data of the variable header and the payload that are of the MQTT subscribe packet. The "reserved bits" field may be set based on a requirement of an application scenario. The variable header may be used to describe information such as an identifier of a device (for example, an identifier of a device of the subscriber). The payload is used to describe a subscription topic.

TABLE 2

| Fixed header of an MQTT publish packet | | | | | | | | |
|---|---|---|---|---|---|---|---|---|
| Bit | 7 | 6 | 5 | 4 | 3 | 2 | 1 | 0 |
| Byte 1 | MQTT control packet type | | | | DUP flag | QoS level | Reserved bits | |
| | 0 | 0 | 1 | 1 | | | | |
| Byte 1 | Remaining length | | | | | | | |

The MQTT publish packet is a packet that is sent by the publisher to the subscriber and that carries an application message, and is primarily used to publish a message. Similarly, the MQTT publish packet also includes three parts: a fixed header, a variable header, and a payload. As shown in Table 2, the fixed header of the MQTT publish packet includes the following fields: MQTT control packet type, duplicate delivery (DUP) flag, Quality of Service (QoS) level, remaining length, and reserved bits. A value of the "MQTT control packet type" field is used to describe a type of the MQTT packet; and if the value is 3, it indicates that the MQTT packet is the MQTT publish packet. The "DUP flag" field is used to describe whether the MQTT publish packet is a retransmitted packet; and if a value of the "DUP flag" field is 0, it indicates that the MQTT publish packet is a packet sent for the first time, or if the value of the "DUP flag" field is 1, it indicates that the MQTT publish packet is a retransmitted packet. The "QoS level" field is used to describe a Quality of Service level for publishing the application message. The "remaining length" field is used to indicate a total quantity of bytes of data of the variable header and the payload that are of the MQTT publish packet. The "reserved bits" field may be set based on a requirement of an application scenario.

As shown in Table 3, the variable header of an MQTT publish packet includes subscription topic information (for example, a length of a subscription topic or a name of the subscription topic) and a packet identifier. Fields in Byte 1 to Byte 2 in Table 3 are used to describe the length of the subscription topic, fields in Byte 3 to Byte 5 are used to describe the name of the subscription topic, fields in Byte 6 to Byte 7 may be used to describe the packet identifier, and the packet identifier may be used to uniquely indicate the MQTT publish packet, a most significant bit (MSB), and a least significant bit (LSB).

The payload of the MQTT publish packet is used to describe a published application message.

TABLE 3

| Variable header of an MQTT publish packet | | | | | | | | | |
|---|---|---|---|---|---|---|---|---|---|
| Description | | 7 | 6 | 5 | 4 | 3 | 2 | 1 | 0 |
| Subscription topic | | | | | | | | | |
| Byte 1 | Length of MSB | | | | | | | | |
| Byte 2 | Length of LSB | | | | | | | | |
| Byte 3 | | | | | | | | | |
| Byte 5 | | | | | | | | | |
| Byte 5 | | | | | | | | | |
| Packet identifier | | | | | | | | | |
| Byte 6 | MSB of a packet identifier | | | | | | | | |

TABLE 3-continued

Variable header of an MQTT publish packet

| Description | 7 | 6 | 5 | 4 | 3 | 2 | 1 | 0 |
|---|---|---|---|---|---|---|---|---|
| Byte 7 LSB of a packet identifier | | | | | | | | |

To implement the configuration management method provided in the present disclosure, the MQTT subscribe packet is modified as follows:

The gateway and the control device may agree to use a reserved bit of the fixed header of the MQTT subscribe packet shown in Table 1 to represent the subscription flag or the forwarding flag. For example, the gateway and the control device may agree to set the value of the reserved bit to 1 to represent the subscription flag, to indicate that the subscription topic carried in the MQTT subscribe packet is subscribed to by the gateway; or agree to set the value of the reserved bit to 2 to represent the forwarding flag, to indicate that the subscription topic carried in the MQTT subscribe packet is subscribed to by the terminal.

After the MQTT subscribe packet is modified, the following agreements are made for rules in the MQTT protocol:

If the gateway needs to send a subscription request to the control device, the value of a reserved bit of the fixed header of the MQTT subscribe packet sent to the control device may be set to the subscription flag (for example, 1), to indicate that the subscription topic carried in the MQTT subscribe packet is subscribed to by the gateway; if the gateway needs to forward the subscription request of the terminal to the control device, the value of a reserved bit of the fixed header of the MQTT subscribe packet sent to the control device may be set to the forwarding flag (for example, 2), to indicate that the subscription topic carried in the MQTT subscribe packet is subscribed to by the terminal; or if the terminal needs to send the subscription request to the control device, the value of a reserved bit of the fixed header of the MQTT subscribe packet sent to the control device may be set to be null, which is consistent with the original MQTT protocol.

TABLE 4

Modified variable header of an MQTT publish packet

Subscription topic

| Byte 1 | Length of MSB |
| Byte 2 | Length of LSB |
| Byte 3 | |
| Byte 5 | |
| Byte 5 | |

Packet identifier

| Byte 6 | MSB of a packet identifier |
| Byte 7 | LSB of a packet identifier |
| Byte 8 | MSB of an identifier of a logical group |
| Byte 9 | LSB of an identifier of a logical group |

Likewise, to implement the configuration management method provided in the present disclosure, the MQTT publish packet is modified as follows:

The gateway and the control device may agree to add, to the variable header of the MQTT publish packet shown in Table 3, two bytes for the identifier of the logical group, to indicate that the application message carried in the MQTT publish packet is sent to the logical group or the gateway. A variable header of the modified MQTT publish packet is shown in Table 4, and Byte 8 and Byte 9 added to the table are used to indicate the identifier of the logical group.

After the MQTT publish packet is modified, the following agreements are made for rules in the MQTT protocol:

If the control device needs to publish an application message to the terminal, an MQTT publish packet that does not carry a bit of the identifier of the logical group is sent to the terminal, which is consistent with the original MQTT protocol; if the control device needs to publish an application message to the gateway, a bit of the identifier of the logical group of the variable header of the MQTT publish packet sent to the gateway may be set to 1, to indicate that the application message carried in the MQTT publish packet is sent to the gateway; or if the control device needs to publish an application message to the terminal by using the gateway, there are two scenarios: (1) If the control device needs to publish the application message to a separate terminal, the subscription topic of the variable header of the MQTT publish packet sent to the gateway may be set to a subscription topic of the terminal, a bit of the identifier of the logical group of the variable header is set to 0; and after receiving the MQTT publish packet, the gateway removes the bit of the identifier of the logical group of the variable header of the MQTT publish packet to obtain an MQTT publish packet that does not carry the bit of the identifier of the logical group, and sends the obtained MQTT publish packet to the terminal; and (2) if the control device needs to publish the application message to the target logical group, the subscription topic of the variable header of the MQTT publish packet sent to the gateway may be set to a subscription topic of each target terminal in the target logical group, the bit of the identifier of the logical group of the variable header is set to the identifier of the target logical group, and the payload is set to at least one application message that matches the subscription topic of each target terminal; and after receiving the MQTT publish packet, the gateway removes the bit of the identifier of the logical group of the variable header of the MQTT publish packet, replaces the subscription topic of the variable header with the subscription topic of the target terminal, replaces the application message in the payload with a target application message that matches the subscription topic of the target terminal, and sends, to the target terminal, the MQTT publish packet that carries the target application message, where the target logical group includes at least one target terminal.

It should be noted that the foregoing subscription topic is a string that is in a UTF-8 format and that is used by the gateway to process a filtering message for the subscriber (for example, the terminal), each subscription topic may include only one level or a plurality of levels, and the levels are separated from each other by "l". Because the subscription topic is lightweight (that is, occupies a small quantity of bytes), the gateway does not need to perform an initialization process before receiving the subscription topic, and further, the control device does not need to create a subscription topic required by the terminal before performing the publication or subscription step.

UTF-8 is a variable width character encoding for the unified character encoding standard Unicode.

In this embodiment of the present disclosure, the control device may publish, by sending an MQTT publish packet on a grouping basis, an application message to the gateway connected to each terminal in a group, and instruct the gateway to send the application message to each terminal, so as to improve message publishing efficiency. In addition, the gateway may send a subscription request to the control device, or may send a subscription request of the terminal to the control device; that is, a subscription mechanism of the gateway and a subscription forwarding mechanism of the gateway are added, so that the subscription mechanism may be more flexible. In addition, when a subscription/publication mechanism of the MQTT protocol is used between the control device and the terminal, a persistent connection between the control device and the terminal is not required, and the control device may be connected to a plurality of gateways in a cascading manner, so that a quantity of accessed terminals may be increased exponentially.

Figure 2:
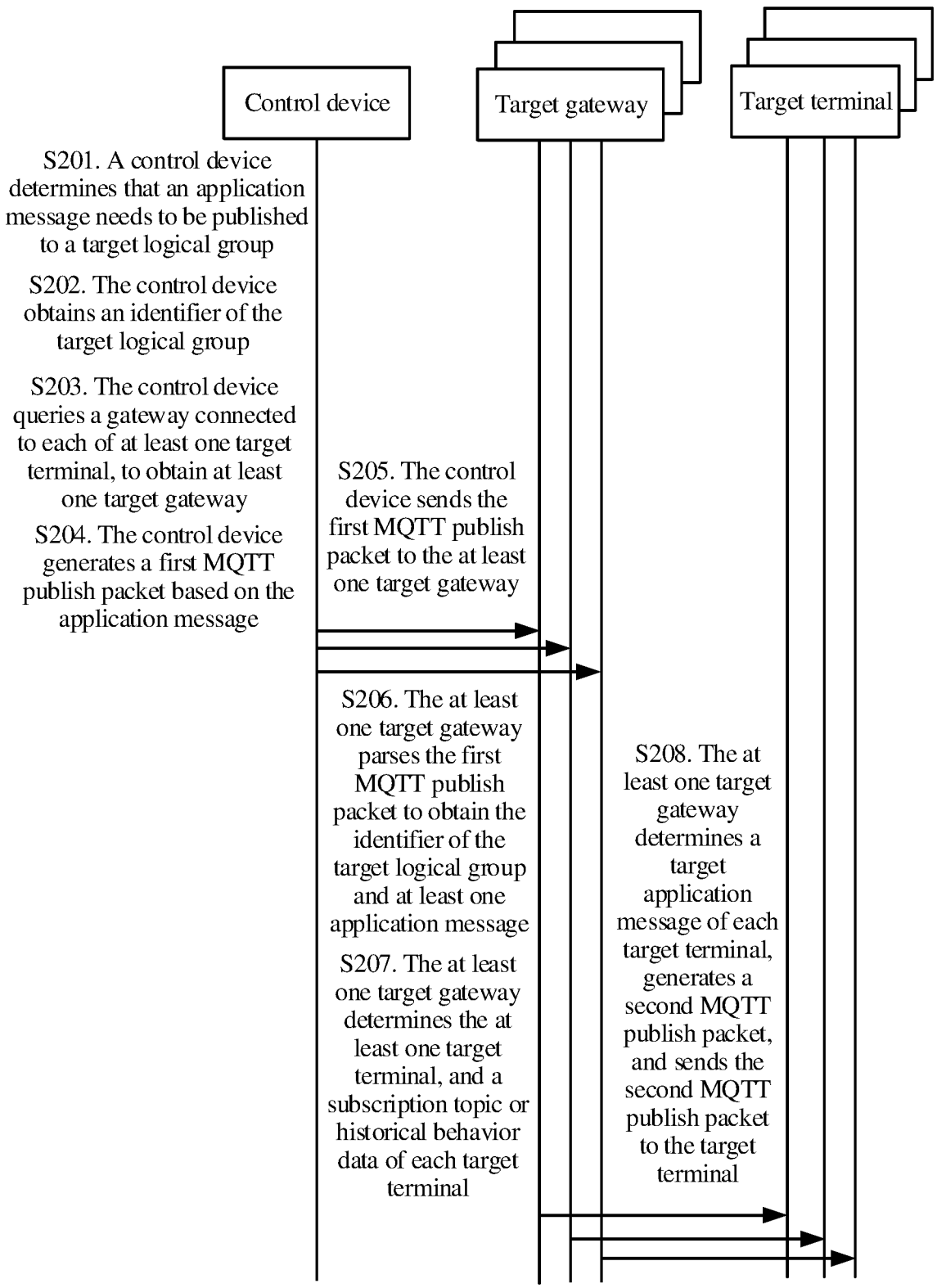
FIG. 2 is a schematic flowchart of a configuration management method according to an embodiment of the present disclosure.

Based on the foregoing description of a network architecture for configuration management, an embodiment of the present disclosure provides a configuration management method, and the method is applied to a control device, a target gateway, and a target terminal. As shown in FIG. 2, the method may include the following steps.

S201. The control device determines that an application message needs to be published to a target logical group.

In an optional implementation, a specific manner of determining that the application message needs to be published to the target logical group includes: if at least one application message that matches a subscription topic of at least one target terminal in the target logical group is detected, determining that the application message needs to be published to the target logical group; or if at least one application message that matches historical behavior data of the at least one target terminal is detected, determining that the application message needs to be published to the target logical group.

For example, if the subscription topic of the at least one target terminal is a configuration update message, and the control device detects a system configuration update message of each target terminal, the control device determines that the application message needs to be published to the target logical group.

For another example, if at least one target gateway determines, based on a run log of a video playing application of the at least one target terminal within a preset time period, that duration of playing technical videos by the at least one target terminal is greater than duration of playing videos of another type, the at least one target gateway may report behavior data of the at least one target terminal to the control device; and if the control device detects an updated technical video, the control device determines that an application message needs to be published to the target logical group.

In this embodiment of the present disclosure, the control device may detect whether at least one application message matches the subscription topic of the at least one target terminal in the target logical group, or detect whether at least one application message matches the behavior data of the at least one target terminal, and if at least one application message matches the subscription topic of the at least one target terminal in the target logical group, or if at least one application message matches the behavior data of the at least one target terminal, the control device determines that the application message needs to be published to the target logical group.

The application message may include a configuration management message, a news message, a notification service message, or the like, and the configuration management message may include a network security policy configuration message, a data collection policy configuration message, an application deployment policy configuration message, or the like. The subscription topic may be a label of an application message, for example, if the application message is a news message, the subscription topic may be military news, financial news, health news, or the like.

Subscription topics of all the target terminals may be the same or may be different, and this is not limited in the present disclosure.

The control device may receive historical behavior data that is reported by the gateway and that is of the at least one target terminal, where the historical behavior data of the at least one target terminal may be determined by the gateway based on a collected run log of an application of the target terminal, for example, a run log of a web browser application in a preset time period, a run log of a video playing application in a preset time period, or a run log of a shopping application in a preset time period.

S202. The control device obtains an identifier of the target logical group, where the target logical group includes at least one target terminal.

S203. The control device queries, according to a gateway mapping table and the identifier of the target logical group, a gateway connected to each of the at least one target terminal, to obtain at least one target gateway.

For example, as shown in FIG. 1, when the control device 101 needs to publish an application message to the first logical group, the control device learns that the identifier of the target logical group is 1, and the control device may learn, through query according to the gateway mapping table and the identifier of the target logical group, that the target gateways connected to the at least one target terminal are the gateway 102 and the gateway 103. The control device may send an MQTT publish packet to the gateway 102 and the gateway 103.

The gateway mapping table records identifiers of a plurality of gateways, identifiers of terminals connected to the plurality of gateways, and an identifier of a logical group to which each terminal belongs. In addition, the control device may dynamically adjust the gateway mapping table based on a result of grouping a plurality of terminals by a device or a control device in the network architecture. For example, if the control device detects that a new terminal is connected to the network architecture, an identifier of the terminal may be recorded in the gateway mapping table; or if the control device detects that a terminal in the network architecture is disconnected from the gateway, an identifier of the terminal may be removed from the gateway mapping table.

The identifier of the logical group may include one or more of a letter, a numerical value, or a symbol.

In this embodiment of the present disclosure, the control device may query, according to the gateway mapping table and the identifier of the target logical group, the gateway connected to each of the at least one target terminal, to obtain the at least one target gateway, so that the control device may send a first MQTT packet to each target gateway on a grouping basis, so as to improve message publishing efficiency.

It should be noted that the identifier of the gateway may refer to a MAC address of the gateway or another identifier that can be used to uniquely identify the gateway, and the identifier of the terminal may refer to the MAC address or another identifier that can be used to uniquely identify the terminal.

S204. The control device generates a first Message Queuing Telemetry Transport MQTT publish packet based on the application message, where the first MQTT publish packet includes the identifier of the target logical group and the application message.

In this embodiment of the present disclosure, the control device may generate the first MQTT publish packet based on the application message and the identifier of the target logical group, so that the target gateway may send the application message to the at least one target terminal, and then manage the at least one target terminal or provide various application services for each target terminal.

In an optional implementation, the control device may generate a variable header in an MQTT format based on the identifier of the target logical group, generate a payload in the MQTT format based on the application message, and encapsulate the variable header and the payload into the first MQTT publish packet.

It should be noted that the control device may add, to the variable header of the first MQTT publish packet, two bytes for the identifier of the logical group, to indicate that the first MQTT publish packet is sent to the logical group or the gateway.

For example, if a subscribe packet needs to be published to each terminal in a logical group whose identifier is 1, and if a name of a subscription topic of each terminal is a/b, a length of the subscription topic is 3, and an identifier of the packet is 10, the control device may add fields of two bytes to the variable header of the first MQTT publish packet to indicate the identifier of the logical group. For example, fields of Byte 8 to Byte 9 are added to the variable header to indicate the identifier of the logical group, and the control device may encapsulate the name of the subscription topic, the length of the subscription topic, the packet identifier, and the identifier of the logical group of each terminal into the variable header in the MQTT format, and obtain an encapsulated variable header of the first MQTT publish packet shown in Table 5.

'a' (0x61) in Table 5 means that the letter a may be represented as 61 in the hexadecimal system. Likewise, '/' (0x2F) means that the symbol / may be represented as 2F in the hexadecimal system, and 'b' (0x62) means that the letter b may be represented as 62 in the hexadecimal system.

TABLE 5

Encapsulated variable header of a first MQTT publish packet

| | Description | 7 | 6 | 5 | 4 | 3 | 2 | 1 | 0 |
|---|---|---|---|---|---|---|---|---|---|
| | Name of a subscription topic | | | | | | | | |
| Byte 1 | Length of MSB (0) | 0 | 0 | 0 | 0 | 0 | 0 | 0 | 0 |
| Byte 2 | Length of LSB (3) | 0 | 0 | 0 | 0 | 0 | 0 | 1 | 1 |
| Byte 3 | 'a' (0 × 61) | 0 | 1 | 1 | 0 | 0 | 0 | 0 | 1 |
| Byte 5 | '/' (0 × 2F) | 0 | 0 | 1 | 0 | 1 | 1 | 1 | 1 |
| Byte 5 | 'b' (0 × 62) | 0 | 1 | 1 | 0 | 0 | 0 | 1 | 0 |
| | Packet identifier | | | | | | | | |
| Byte 6 | MSB (0) of a packet identifier | 0 | 0 | 0 | 0 | 0 | 0 | 0 | 0 |
| Byte 7 | LSB (10) of a packet identifier | 0 | 0 | 0 | 0 | 1 | 0 | 1 | 0 |
| Byte 8 | MSB of an identifier of a logical group | 0 | 0 | 0 | 0 | 0 | 0 | 0 | 0 |
| Byte 9 | LSB (1) of an identifier of a logical group | 0 | 0 | 0 | 0 | 0 | 0 | 0 | 1 |

The control device may generate the payload in the MQTT format based on an application message that matches the subscription topic of each terminal, where a format of the payload of the first MQTT publish packet is not fixed, and may be set based on a factor such as an application scenario of the application message. After the variable header and the payload are obtained, the variable header and the payload may be encapsulated into the first MQTT publish packet, so that the first MQTT publish packet may be sent to each target gateway.

In this embodiment of the present disclosure, the control device and the target gateway may agree in advance to encapsulate the identifier of the logical group and the application message in a location in the MQTT format, for example, agree to encapsulate the identifier of the logical group in the variable header in the MQTT format, and encapsulate the application message in the payload in the MQTT format; that is, the control device may generate the variable header in the MQTT format based on the identifier of the target logical group, generate the payload in the MQTT format based on the application message, and encapsulate the variable header and the payload into the first MQTT publish packet, so that the first MQTT publish packet may be published to each target gateway.

It should be noted that the first MQTT publish packet further includes a fixed header, where the fixed header may include a type field, and the type field is used to indicate a type of the first MQTT publish packet. For example, the type field indicates that the type of the first MQTT publish packet is a message publishing packet.

S205. The control device sends the first MQTT publish packet to the at least one target gateway.

The first MQTT publish packet is used to instruct a target gateway that receives the first MQTT publish packet to send a corresponding application message to each target terminal that is connected to the target gateway and that belongs to the target logical group.

In this embodiment of the present disclosure, the control device may send the first MQTT publish packet to the at least one target gateway, so that the at least one target gateway may send the application message in the first MQTT publish packet to the at least one target terminal.

The first MQTT publish packet may carry one or more application messages. In other words, if the subscription topics or the behavior data of all of the at least one target terminal are consistent, the first MQTT publish packet may carry one application message; that is, that a corresponding application message is sent to each target terminal that is connected to the target gateway and that belongs to the target logical group may be that the target gateway sends a same application message to each target terminal, where the application message matches the subscription topic or the behavior data of the target terminal. If the subscription topics or the behavior data of all of the at least one target terminal are inconsistent, the first MQTT publish packet may carry a plurality of application messages; that is, that a corresponding application message is sent to each target terminal that is connected to the target gateway and that belongs to the target logical group may be that the target gateway sends, to each of the at least one target terminal, the application message that matches the subscription topic or the behavior data of the target terminal. If a subscription topic of a terminal 1 is wide area network (WAN) configuration, the target gateway sends an application message that matches the WAN configuration to the terminal 1; or if a subscription topic of a terminal 2 is network security configuration, the target gateway sends an application message that matches the network security configuration to the terminal 2.

S206. The at least one target gateway parses the first MQTT publish packet to obtain the identifier of the target logical group and at least one application message.

In this embodiment of the present disclosure, the at least one target gateway may parse the variable header of the first MQTT publish packet to obtain the identifier of the target logical group, and may parse the payload of the MQTT publish packet to obtain the at least one application message.

In an optional embodiment, before performing step S206, the at least one target gateway may further receive the first Message Queuing Telemetry Transport MQTT publish packet sent by the control device.

S207. The at least one target gateway determines, based on a grouping mapping table and the identifier of the target logical group, at least one target terminal that is connected to the target gateway and that belongs to the target logical group, and a subscription topic or historical behavior data of each of the at least one target terminal.

For example, as shown in FIG. 1, after receiving the first MQTT publish packet, the gateway 102 and the gateway 103 may parse the first MQTT publish packet to obtain the at least one application message and the identifier of the target logical group (for example, 1). The gateway 102 determines, based on the grouping mapping table and the identifier of the target logical group, that the at least one target terminal are the terminal 2 to the terminal 4, and determines that subscription topics of the terminal 2 to the terminal 4 are network traffic policy configuration. The gateway 103 determines, based on the grouping mapping table and the identifier of the target logical group, that the at least one target terminal is the terminal 5 to the terminal 8, determines that a subscription topic of the terminal 5 is the network traffic policy configuration, and determines that subscription topics of the terminal 6 to the terminal 8 are performance indicator data (for example, network quality indicator data).

The grouping mapping table records an identifier of each terminal connected to the gateway, the identifier of the logical group to which each terminal belongs, and the subscription topic or the historical behavior data of each terminal. In addition, the gateway may dynamically adjust the grouping mapping table based on the result of grouping the plurality of terminals by the device or the control device in the network architecture. For example, if the gateway detects that a new terminal is connected to the network architecture, an identifier of the terminal may be recorded in the grouping mapping table; or if the gateway detects that a terminal in the network architecture is disconnected from the gateway, an identifier of the terminal may be removed from the grouping mapping table.

In this embodiment of the present disclosure, the at least one target gateway determines, based on the grouping mapping table and the identifier of the target logical group, the at least one target terminal and the subscription topic or the historical behavior data of each of the at least one target terminal, so that the application message that matches the subscription topic or the historical behavior data can be sent to each of the at least one target terminal.

S208. The at least one target gateway determines, from the at least one application message, a target application message that matches the historical behavior data or the subscription topic of each of the at least one target terminal, generates a second MQTT publish packet based on the target application message, and sends, to the target terminal, the second MQTT publish packet that carries the target application message.

For example, as shown in FIG. 1, if the subscription topics of the terminal 2 to the terminal 4 are the network traffic policy configuration, the gateway 102 may remove the bit of the identifier of the logical group from the variable header of the received first MQTT publish packet, replace the subscription topic in the variable header of the first MQTT publish packet with the subscription topic (that is, the network traffic policy configuration) of the terminal 2, and replace an application message in the payload of the first MQTT publish packet with a target application message that matches the network traffic policy configuration, so as to obtain the second MQTT publish packet that carries the target application message. Because the subscription topics of the terminal 2 to the terminal 4 are the same, the gateway 102 may send the second MQTT publish packet to the terminal 2 to the terminal 4. After receiving the MQTT publish packet, the terminal 2 to the terminal 4 may parse the second MQTT publish packet to obtain the target application message. In addition, networks of the terminal 2 to the terminal 4 may be configured based on the target application message; that is, the control device may implement configuration management on the terminal 2 to the terminal 4.

If the subscription topic of the terminal 5 is the network traffic policy configuration, the gateway 103 may remove the bit of the identifier of the logical group from the variable header of the received first MQTT publish packet, replace the subscription topic in the variable header of the first MQTT publish packet with the subscription topic (that is, the network traffic policy configuration) of the terminal 5, and replace the application message in the payload of the first MQTT publish packet with the target application message that matches the network traffic policy configuration, so as to obtain the second MQTT publish packet that carries the target application message. The gateway 103 may send the second MQTT publish packet to the terminal 5. After receiving the second MQTT publish packet, the terminal 5 may parse the MQTT publish packet to obtain the target application message. Then a network of the terminal 5 may be configured based on the target application message; that is, the control device may implement configuration management on the terminal 5.

If the subscription topics of the terminal 6 to the terminal 8 are the performance indicator data (for example, the network quality indicator data), the gateway 103 may remove the bit of the identifier of the logical group from the variable header of the received first MQTT publish packet, replace the subscription topic in the variable header of the first MQTT publish packet with the subscription topic (that is, the network quality indicator data) of the terminal 6, and replace the application message in the payload of the first MQTT publish packet with a target application message that matches the network quality indicator data, so as to obtain the second MQTT publish packet that carries the target application message. Because the subscription topics of the terminal 6 to the terminal 8 are the same, the gateway 103 may send the second MQTT publish packet to the terminal 6 to the terminal 8, and the control device may provide a performance indicator data collection service for the terminal 6 to the terminal 8.

In this embodiment of the present disclosure, the at least one target gateway may determine, from the at least one application message, the target application message that matches the historical behavior data or the subscription topic of each of the at least one target terminal, and send, to the target terminal, the second MQTT publish packet that carries the target application message, so as to manage each target terminal in the target logical group or provide a service for each target terminal.

In an optional implementation, the control device may send, to the terminal, the MQTT publish packet that carries the application message, or send, to the gateway, the MQTT publish packet that carries the application message.

In this embodiment of the present disclosure, the control device may send, to a terminal connected to the control device, the MQTT publish packet that carries the application message, or send, to the gateway, the MQTT publish packet that carries the application message, for example, send the system configuration update message or a grouping message to the gateway.

It should be noted that, when publishing the MQTT publish packet to the gateway, the control device may add the bit of the identifier of the logical group to the variable header of the MQTT publish packet, for example, set all fields in Byte 8 to Byte 9 in Table 5 to 1, where the bit of the identifier is used to indicate whether the MQTT publish packet is sent to the gateway.

In an optional implementation, the gateway may receive the MQTT publish packet that carries the application message and that is sent by the control device.

In this embodiment of the present disclosure, the gateway may receive the MQTT publish packet that carries the application message and that is sent by the control device, so that a corresponding operation may be performed based on the MQTT publish packet, for example, the gateway may perform system update by using a system configuration update message sent by the control device.

For example, as shown in FIG. 1, after receiving the MQTT publish packet that carries the application message and that is sent by the control device 101, the gateway 102 may parse the MQTT publish packet and learn that all fields in Byte 8 to Byte 9 of the variable header of the MQTT publish packet are 1, and may determine that the MQTT publish packet is sent to the gateway 102.

In this embodiment of the present disclosure, the control device may send, on a grouping basis, the MQTT publish packet to the gateway connected to each terminal in a group, and instruct the gateway to send the application message to each terminal, so as to improve message sending efficiency, and then manage each terminal in the group or provide the service for the terminals in the group.

Figure 3:
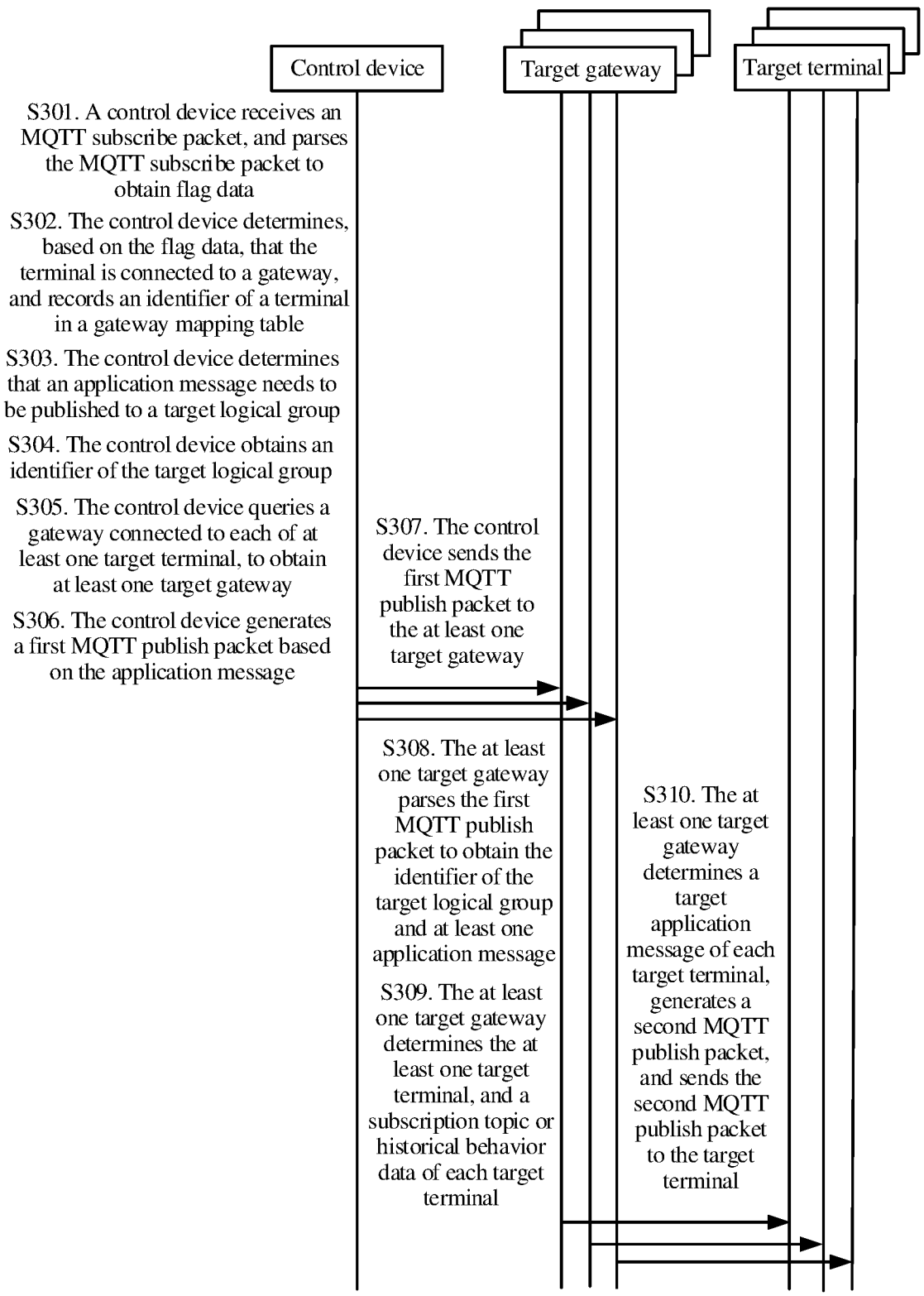
FIG. 3 is a schematic flowchart of another configuration management method according to an embodiment of the present disclosure.

Based on the foregoing description of a network architecture for configuration management, an embodiment of the present disclosure provides another configuration management method, and the method is applied to a control device, a target gateway, and a target terminal. As shown in FIG. 3, the method may include the following steps.

S301. A control device receives an MQTT subscribe packet that carries a subscription topic, and parses the MQTT subscribe packet to obtain flag data.

In this embodiment of the present disclosure, the control device may receive the MQTT subscribe packet that carries the subscription topic, and parse the MQTT subscribe packet to obtain the flag data, so that a device that subscribes to the subscription topic may be determined based on the flag data, or a connection relationship between a gateway and a terminal may be determined.

S302. If the flag data includes a forwarding flag, an identifier of a terminal, and an identifier of a gateway, the control device determines that the subscription topic is subscribed to by the terminal, determines that the terminal is connected to the gateway, and records the identifier of the terminal in an entry corresponding to the identifier of the gateway in a gateway mapping table.

In this embodiment of the present disclosure, if the flag data includes the forwarding flag, the identifier of the terminal, and the identifier of the gateway, the control device may determine that the subscription topic is subscribed to by the terminal, determine that the terminal is connected to the gateway, and record the identifier of the terminal in the entry corresponding to the identifier of the gateway in the gateway mapping table. Therefore, the control device can not only determine the connection relationship between the gateway and the terminal, but also support the gateway in forwarding the subscription topic, so that a subscription mechanism is more flexible.

In an optional embodiment, the MQTT subscribe packet that carries the subscription topic is received, and the MQTT subscribe packet is parsed to obtain the flag data. If the flag data includes a subscription flag and the identifier of the gateway, it is determined that the subscription topic is subscribed to by the gateway, and the identifier of the gateway is recorded in the gateway mapping table.

In this embodiment of the present disclosure, the control device receives the MQTT subscribe packet that carries the subscription topic, and may parse the MQTT subscribe packet to obtain the flag data. If the flag data includes the subscription flag and the identifier of the gateway, it is determined that the subscription topic is subscribed to by the gateway, and the identifier of the gateway is recorded in the gateway mapping table. Therefore, the control device may determine the connection relationship between the gateway and the terminal, determine that the subscription topic is subscribed to by the gateway, and support the gateway in subscribing to a topic, so that the subscription mechanism is more flexible.

It should be noted that the gateway and the control device may agree to use a reserved bit of a fixed header of the MQTT subscribe packet to represent the forwarding flag or the subscription flag. For example, the gateway and the control device may agree to set a value of the reserved bit to 1 to represent the subscription flag, to indicate that the subscription topic is subscribed to by the gateway; or agree to set the value of the reserved bit to 2 to represent the forwarding flag, to indicate that the subscription topic is subscribed to by the terminal.

For example, as shown in FIG. 1, after receiving the MQTT subscribe packet, the control device 101 may parse a payload of the MQTT subscribe packet to obtain the subscription topic, parse the fixed header of the MQTT subscribe packet and learn that the value of the reserved bit of the fixed header is 1, and then determine that the flag data includes the subscription flag. After parsing a variable header of the MQTT subscribe packet and learning that the identifier of the gateway is 102, the control device 101 may determine that the subscription topic is subscribed to by the gateway 102, and may record the identifier of the gateway in the gateway mapping table shown in Table 6.

For another example, as shown in FIG. 1, after receiving the MQTT subscribe packet, the control device 101 may parse the payload of the MQTT subscribe packet to obtain the subscription topic, parse the fixed header of the MQTT subscribe packet and learns that the value of the reserved bit of the fixed header is 2, and then determine that the flag data includes the forwarding flag. After parsing the variable header of the MQTT subscribe packet and learning that the identifier of the terminal is 1 and the identifier of the gateway is 102, the control device 101 may determine that the subscription topic is subscribed to by the terminal 1, and determine that the terminal 1 is connected to the gateway 102, record the identifier 1 of the terminal in an entry corresponding to the identifier 102 of the gateway in the gateway mapping table shown in Table 1. Likewise, the control device may determine that the gateway 102 is connected to the terminal 2 to the terminal 4, determine that the gateway 103 is connected to the terminal 5 to the terminal 8, and record the identifier of each gateway and the identifier of the terminal in the gateway mapping table shown in Table 6.

In an optional implementation, the control device may group a plurality of terminals connected to a plurality of gateways based on subscription topics of the plurality of terminals, or randomly group the plurality of terminals, or group the plurality of terminals based on the plurality of gateways, to obtain a plurality of logical groups, set an identifier for each logical group, and record an identifier of each logical group in an entry corresponding to an identifier of each terminal in the logical group in the gateway mapping table.

In this embodiment of the present disclosure, the control device may group the terminals connected to the plurality of gateways based on subscription topics of the plurality of terminals. For example, the control device may classify terminals that have a same subscription topic into one group, or may randomly group the plurality of terminals, or may group the plurality of terminals based on the plurality of gateways, for example, classify terminals connected to a same gateway into one group. In this way, the control device can obtain the plurality of logical groups, and then set the identifier for each logical group, and record the identifier of each logical group in the entry corresponding to the identifier of each terminal in the logical group in the gateway mapping table, so that the terminal in each logical group can be determined based on the group identifier.

For example, as shown in FIG. 1, the control device 101 may group the terminals connected to each gateway. For example, the terminal 2 to the terminal 8 may be classified into a first logical group, an identifier of the first logical group may be set to 1, the terminal 1 may be classified into a second logical group, an identifier of the second logical group may be set to 2, and the identifier of each logical group is recorded in the gateway mapping table shown in Table 6.

TABLE 6

Gateway mapping table

|  | Identifier of a terminal | Identifier of a gateway connected to the terminal | Identifier of a logical group to which the terminal belongs |
| --- | --- | --- | --- |
| Terminal 1 | 1 | 102 | 2 |
| Terminal 2 | 2 | 102 | 1 |
| Terminal 3 | 3 | 102 | 1 |
| Terminal 4 | 4 | 102 | 1 |
| Terminal 5 | 5 | 103 | 1 |
| Terminal 6 | 6 | 103 | 1 |
| Terminal 7 | 7 | 103 | 1 |
| Terminal 8 | 8 | 103 | 1 |

In an optional implementation, the gateway may generate a variable header in an MQTT format based on the identifier of the terminal and the identifier of the gateway, generate a payload in the MQTT format based on the subscription topic of the terminal, generate a fixed header in the MQTT format based on the forwarding flag, encapsulate the variable header, the payload, and the fixed header into the MQTT subscribe packet, and send the MQTT subscribe packet to the control device, where the MQTT subscribe packet is used to instruct the control device to determine that the subscription topic is subscribed to by the terminal, determine that the terminal is connected to the gateway, and record the identifier of the terminal in the entry corresponding to the identifier of the gateway in the gateway mapping table.

For example, as shown in FIG. 1, the gateway 102 may generate the variable header in the MQTT format based on the identifier 1 of the terminal and the identifier 102 of the gateway, generate the payload in the MQTT format based on the subscription topic of the terminal, generate the fixed header in the MQTT format based on the forwarding flag (for example, 2), encapsulate the variable header, the payload, and the fixed header into the MQTT subscribe packet, and send the MQTT subscribe packet to the control device 101 to instruct the control device 101 to determine that the subscription topic is subscribed to by the terminal 1, determine that the terminal 1 is connected to the gateway 102, and record the identifier 1 of the terminal in the entry corresponding to the identifier 102 of the gateway in the gateway mapping table.

In an optional implementation, the gateway may generate a variable header in the MQTT format based on the identifier of the gateway, generate a payload in the MQTT format based on the subscription topic of the gateway, generate a fixed header in the MQTT format based on the subscription flag, encapsulate the variable header, the payload, and the fixed header into the MQTT subscribe packet, and send the MQTT subscribe packet to the control device to instruct the control device to determine that the subscription topic is subscribed to by the gateway, and record the identifier of the gateway in the gateway mapping table.

For example, as shown in FIG. 1, the gateway 102 may generate the variable header in the MQTT format based on the identifier 102 of the gateway, generate the payload in the MQTT format based on the subscription topic of the gateway, generate a reserved bit of the fixed header in the MQTT format based on the subscription flag (for example, 1), encapsulate the variable header, the payload, and the fixed header into the MQTT subscribe packet, and send the MQTT subscribe packet to the control device 101 to instruct the control device 101 to determine that the subscription topic is subscribed to by the gateway 102, and record the identifier 102 of the gateway in the gateway mapping table.

S303. The control device determines that an application message needs to be published to a target logical group.

S304. The control device obtains an identifier of the target logical group, where the target logical group includes at least one target terminal.

S305. The control device queries, according to the gateway mapping table and the identifier of the target logical group, a gateway connected to each of the at least one target terminal, to obtain at least one target gateway.

S306. The control device generates a first Message Queuing Telemetry Transport MQTT publish packet based on the application message, where the first MQTT publish packet includes the identifier of the target logical group and the application message.

S307. The control device sends the first MQTT publish packet to the at least one target gateway.

S308. The at least one target gateway parses the first MQTT publish packet to obtain the identifier of the target logical group and at least one application message.

S309. The at least one target gateway determines, based on a grouping mapping table and the identifier of the target logical group, at least one target terminal that is connected to the target gateway and that belongs to the target logical group, and a subscription topic or historical behavior data of each of the at least one target terminal.

In an optional implementation, the gateway may receive a subscription request of the terminal, parse the subscription request to obtain the identifier of the terminal and the subscription topic of the terminal, and determine that the terminal is connected to the gateway. The gateway may record the identifier of the terminal and the subscription topic of the terminal in an entry in the grouping mapping table, and receive a grouping message sent by the control device, where the grouping message includes the identifier of the terminal and an identifier of a logical group to which the terminal belongs. The gateway may record the identifier of the logical group to which the terminal belongs in an entry corresponding to the identifier of the terminal in the grouping mapping table.

TABLE 7

Grouping mapping table

| Identifier of a terminal | Identifier of a gateway connected to the terminal | Subscription topic of the terminal | Identifier of a logical group to which the terminal belongs |
|---|---|---|---|
| Terminal 1 | 102 | WAN configuration | 2 |
| Terminal 2 | 102 | Network security configuration | 1 |
| Terminal 3 | 102 | Network traffic policy configuration | 1 |
| Terminal 4 | 102 | Device maintenance configuration | 1 |

For example, as shown in FIG. 1, after receiving subscription requests of the terminal 1 to the terminal 4, the gateway 102 may parse the subscription requests and learn that a subscription topic of the terminal 1 is the WAN configuration, a subscription topic of the terminal 2 is the network security configuration, a subscription topic of the terminal 3 is the network traffic policy configuration, a subscription topic of the terminal 4 is the device maintenance configuration, and identifiers of the terminal 1 to the terminal 4 are respectively 1, 2, 3, and 4; and may record the identifier of each terminal and the subscription topic of each terminal in the entry corresponding to the identifier of the gateway in the grouping mapping table. When receiving a grouping message sent by the control device 101, the gateway 102 may parse the group message to obtain an identifier of a terminal connected to the gateway 102 and an identifier of a logical group to which each terminal belongs, for example, it is learned that the identifiers of the terminals connected to the gateway are respectively 1, 2, 3, and 4, the identifier of the logical group to which the terminal 2 to terminal 4 belong is 1, and the identifier of the logical group to which the terminal 1 belongs is 2, and the gateway 102 may record the identifier of the logical group to which each terminal belongs in an entry corresponding to the identifier of each terminal in the grouping mapping table shown in table 7.

In an optional embodiment, the gateway may obtain historical behavior data of a terminal connected to the gateway, and record the historical behavior data of the terminal in the entry corresponding to the identifier of the terminal in the grouping mapping table.

In this embodiment of the present disclosure, the gateway may collect a run log of an application of the terminal, for example, a run log of a web browser application in a preset time period, a run log of a video playing application in a preset time period, or a run log of a shopping application in a preset time period, determine behavior data of the terminal based on the run log of the application, and record the historical behavior data of the terminal in the entry corresponding to the identifier of the terminal in the grouping mapping table.

S310. The at least one target gateway determines, from the at least one application message, a target application message that matches the historical behavior data or the subscription topic of each of the at least one target terminal, generates a second MQTT publish packet based on the target application message, and sends, to the target terminal, the second MQTT publish packet that carries the target application message.

Figure 5:
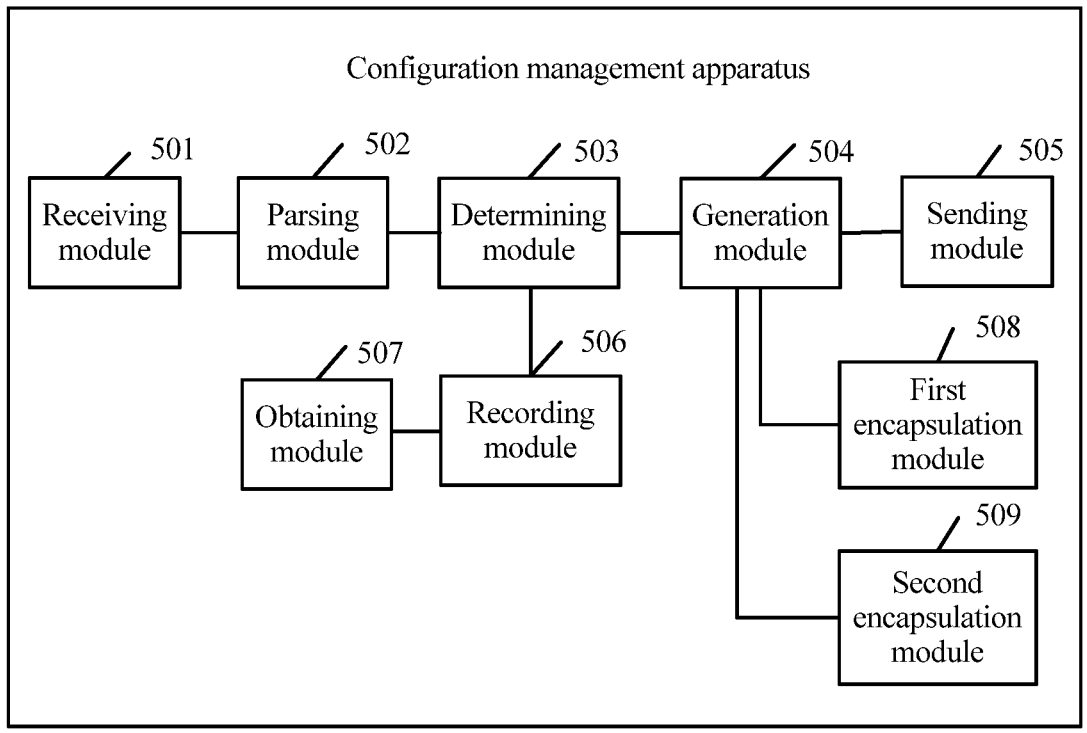
FIG. 5 is a schematic structural diagram of another configuration management apparatus according to an embodiment of the present disclosure.

It should be noted that, if the control device needs to publish the application message to one terminal, the control device may send the MQTT publish packet to a gateway connected to the terminal, and may set, in a variable header of the MQTT publish packet, a bit of the identifier of the logical group, for example, all fields in Byte 8 to Byte 9 in FIG. 5 may be set to 0, where the bit of the identifier is used to indicate that the application message is sent to one terminal. When receiving the MQTT publish packet, the gateway parses the MQTT publish packet to obtain the application message, and may send the application message to the terminal.

It should be noted that, for explanation on and description of steps S303 to S310 in this embodiment of the present disclosure, reference may be made to the explanation and description of steps S201 to S208 in FIG. 2, and details are not described again.

In this embodiment of the present disclosure, the control device may publish, by sending a message on a grouping basis, the application message to the gateway connected to each terminal in the group, and instruct the gateway to send the application message to each terminal, so that message publishing efficiency may be improved. The gateway may send the subscription request to the control device, or may send the subscription request to the control device, that is, a subscription mechanism of the gateway and a subscription forwarding mechanism of the gateway are added, so that the subscription mechanism may be more flexible. In addition, when a subscription/publication mechanism of the MQTT protocol is used between the control device and the terminal, a persistent connection between the control device and the terminal is not required, and the control device may be connected to a plurality of gateways in a cascading manner, so that a quantity of accessed terminals may be increased exponentially.

Figure 4:
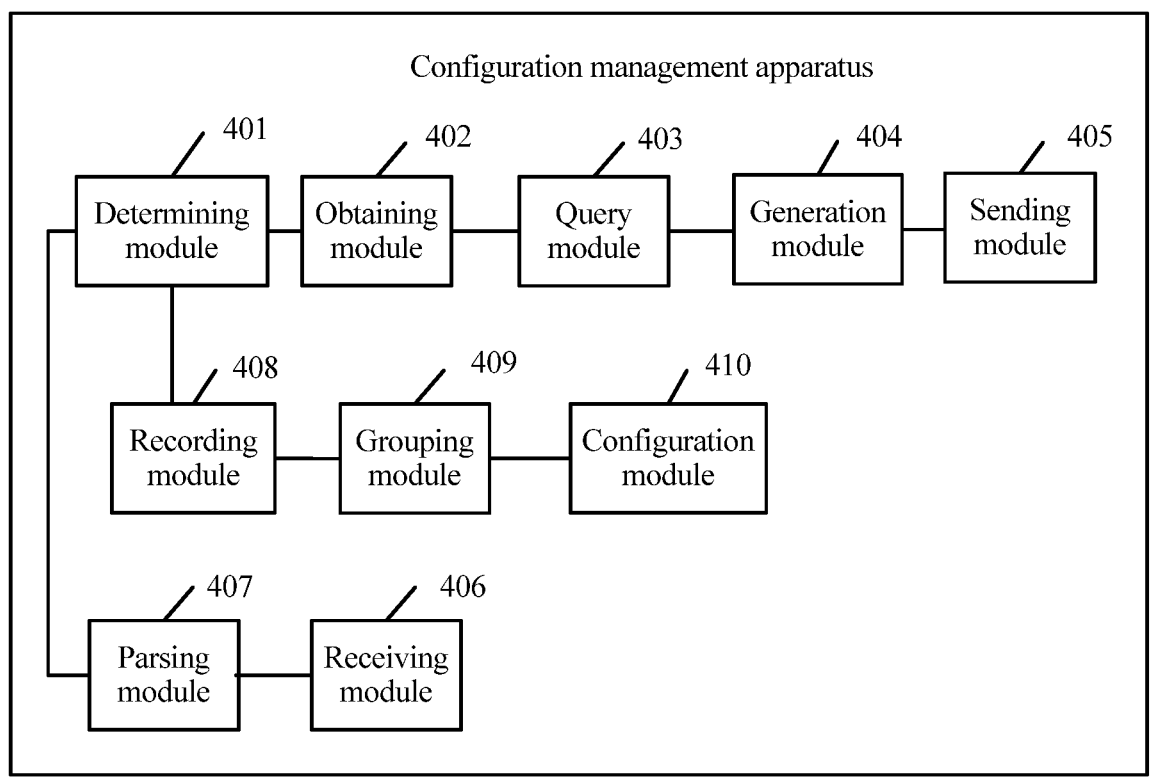
FIG. 4 is a schematic structural diagram of a configuration management apparatus according to an embodiment of the present disclosure.

Based on the foregoing description of a configuration management method, an embodiment of the present disclosure provides a configuration management apparatus, and the apparatus is applied to a control device. Referring to FIG. 4, the configuration management apparatus shown in FIG. 4 may include a determining module 401, an obtaining module 402, a query module 403, a generation module 404, a sending module 405, a receiving module 406, a parsing module 407, a recording module 408, a grouping module 409, and a configuration module 410.

The determining module 401 is configured to determine that an application message needs to be published to a target logical group.

The obtaining module 402 is configured to obtain an identifier of the target logical group, where the target logical group includes at least one target terminal.

The query module 403 is configured to query, according to a gateway mapping table and the identifier of the target logical group, a gateway connected to each of the at least one target terminal, to obtain at least one target gateway, where the gateway mapping table records identifiers of a plurality of gateways, an identifier of a terminal connected to each of the plurality of gateways, and an identifier of a logical group to which each terminal belongs.

The generation module 404 is configured to generate a Message Queuing Telemetry Transport MQTT publish packet based on the application message, where the MQTT publish packet includes the identifier of the target logical group and the application message.

The sending module 405 is configured to send the MQTT publish packet to the at least one target gateway, where the MQTT publish packet is used to instruct a target gateway that receives the MQTT publish packet to send a corresponding application message to each target terminal that is connected to the target gateway and that belongs to the target logical group.

Optionally, the receiving module 406 is configured to receive an MQTT subscribe packet that carries a subscription topic.

Optionally, the parsing module 407 is configured to parse the MQTT subscribe packet to obtain flag data.

Optionally, the determining module 401 is further configured to: if the flag data includes a subscription flag and an identifier of a gateway, determine that the subscription topic is subscribed to by the gateway.

Optionally, the recording module 408 is configured to record the identifier of the gateway in the gateway mapping table.

Optionally, the determining module 401 is further configured to: if the flag data includes a forwarding flag, an identifier of a terminal, and an identifier of a gateway, determine that the subscription topic is subscribed to by the terminal, and determine that the terminal is connected to the gateway.

Optionally, the recording module 408 is further configured to record the identifier of the terminal in an entry corresponding to the identifier of the gateway in the gateway mapping table.

Optionally, the grouping module 409 is configured to: group a plurality of terminals connected to the plurality of gateways based on subscription topics of the plurality of terminals, or randomly group the plurality of terminals, or group the plurality of terminals based on the plurality of gateways, to obtain a plurality of logical groups.

Optionally, the configuration module 410 is configured to set an identifier for each logical group.

Optionally, the recording module 408 is further configured to record the identifier of each logical group in an entry corresponding to the identifier of each terminal in the logical group in the gateway mapping table.

Optionally, the determining module 401 is specifically configured to: if at least one application message that matches a subscription topic of the at least one target terminal in the target logical group is detected, determine that the application message needs to be published to the target logical group; or if at least one application message that matches historical behavior data of the at least one target terminal is detected, determine that the application message needs to be published to the target logical group.

Optionally, the generation module 404 is specifically configured to: generate a variable header in an MQTT format based on the identifier of the target logical group; generate a payload in the MQTT format based on the application message; and encapsulate the variable header and the payload into the MQTT publish packet.

Optionally, the sending module 405 is further configured to: send, to the terminal, an MQTT publish packet that carries the application message; or send, to the gateway, the MQTT publish packet that carries the application message.

In this embodiment of the present disclosure, the configuration management apparatus has a function of implementing the corresponding steps performed by the control device in the configuration management methods in the embodiments corresponding to FIG. 2 and FIG. 3. The function may be implemented by hardware, or may be implemented by hardware by executing corresponding software. The hardware or the software includes one or more modules corresponding to the foregoing function. The foregoing module may be software and/or hardware.

Based on a same disclosure concept, for problem-resolving principles and beneficial effects of the configuration management apparatus, reference may be made to the implementations of the configuration management methods described in FIG. 2 and FIG. 3 and the brought beneficial effects. Therefore, for implementations of the configuration management apparatus, reference may be made to the implementations of the configuration management methods described in FIG. 2 and FIG. 3, and details are not described herein again.

In this embodiment of the present disclosure, the control device may publish, by sending a message on a grouping basis, the application message to the gateway connected to each terminal in a group, and instruct the gateway to send the application message to each terminal, so that the message publishing efficiency is improved. The gateway may send a subscription request to the control device, or may send a subscription request of the terminal to the control device, that is, a subscription mechanism of the gateway and a subscription forwarding mechanism of the gateway are added, so that the subscription mechanism may be more flexible. In addition, when a subscription/publication mechanism of the MQTT protocol is used between the control device and the terminal, a persistent connection between the control device and the terminal is not required, and the control device may be connected to a plurality of gateways in a cascading manner, so that a quantity of accessed terminals may be increased exponentially.

Based on the foregoing description of a configuration management method, an embodiment of the present disclosure provides another configuration management apparatus, and the apparatus is applied to a gateway. Referring to FIG. 5, the configuration management apparatus shown in FIG. 5 may include a receiving module 501, a parsing module 502, a determining module 503, a generation module 504, a sending module 505, a recording module 506, an obtaining module 507, a first encapsulation module 508, and a second encapsulation module 509.

The receiving module 501 is configured to receive a first Message Queuing Telemetry Transport MQTT publish packet sent by a control device.

The parsing module 502 is configured to parse the first MQTT publish packet to obtain an identifier of a target logical group and at least one application message.

The determining module 503 is configured to determine, based on a grouping mapping table and the identifier of the target logical group, at least one target terminal that is connected to the gateway and that belongs to the target logical group, and a subscription topic or historical behavior data of each of the at least one target terminal, where the grouping mapping table records an identifier of each terminal that is connected to the gateway, an identifier of a logical group to which each terminal belongs, and a subscription topic or historical behavior data of each terminal.

The determining module 503 is further configured to determine, from the at least one application message, a target application message that matches the historical behavior data or the subscription topic of each of the at least one target terminal.

The generation module 504 is configured to generate a second MQTT publish packet based on the target application message.

The sending module 505 is configured to send, to the target terminal, the second MQTT publish packet that carries the target application message.

Optionally, the receiving module 501 is further configured to receive a subscription request of a terminal.

Optionally, the parsing module 502 is further configured to parse the subscription request to obtain an identifier of the terminal and a subscription topic of the terminal.

Optionally, the determining module 503 is further configured to determine that the terminal is connected to the gateway.

Optionally, the recording module 506 is configured to record the identifier of the terminal and the subscription topic of the terminal in an entry of the grouping mapping table.

Optionally, the receiving module 501 is further configured to receive a grouping message sent by the control device, where the grouping message includes the identifier of the terminal and an identifier of a logical group to which the terminal belongs.

Optionally, the recording module 506 is further configured to record the identifier of the logical group to which the terminal belongs in an entry corresponding to the identifier of the terminal in the grouping mapping table.

Optionally, the obtaining module 507 is configured to obtain historical behavior data of the terminal.

Optionally, the recording module 506 is further configured to record the historical behavior data of the terminal in the entry corresponding to the identifier of the terminal in the grouping mapping table.

Optionally, the generation module 504 is further configured to: generate a variable header in an MQTT format based on the identifier of the terminal and an identifier of the gateway; generate a payload in the MQTT format based on the subscription topic of the terminal; and generate a fixed header in the MQTT format based on a forwarding flag.

Optionally, the first encapsulation module 508 is configured to encapsulate the variable header, the payload, and the fixed header into an MQTT subscribe packet.

Optionally, the sending module 505 is further configured to send the MQTT subscribe packet to the control device, where the MQTT subscribe packet is used to instruct the control device to determine that the subscription topic is subscribed to by the terminal, determine that the terminal is connected to the gateway, and record the identifier of the terminal in an entry corresponding to the identifier of the gateway in a gateway mapping table of the control device.

Optionally, the generation module 504 is further configured to: generate a variable header in the MQTT format based on the identifier of the gateway; generate a payload in the MQTT format based on a subscription topic of the gateway; and generate a fixed header in the MQTT format based on a subscription flag.

Optionally, the second encapsulation module 509 is configured to encapsulate the variable header, the payload, and the fixed header into the MQTT subscribe packet.

Optionally, the sending module 505 is further configured to send the MQTT subscribe packet to the control device, where the MQTT subscribe packet is used to instruct the control device to determine that the subscription topic is subscribed to by the gateway, and record the identifier of the gateway in the gateway mapping table of the control device.

Optionally, the receiving module 501 is configured to receive an MQTT publish packet that carries an application message and that is sent by the control device.

In this embodiment of the present disclosure, the configuration management apparatus has a function of implementing the corresponding steps performed by the gateway in the configuration management methods in the embodiments corresponding to FIG. 2 and FIG. 3. The function may be implemented by hardware, or may be implemented by hardware by executing corresponding software. The hardware or the software includes one or more modules corresponding to the foregoing function. The foregoing module may be software and/or hardware.

Based on a same disclosure concept, for problem-resolving principles and beneficial effects of the configuration management apparatus, reference may be made to the implementations of the configuration management methods described in FIG. 2 and FIG. 3 and the brought beneficial effects. Therefore, for implementations of the configuration management apparatus, reference may be made to the implementations of the configuration management methods described in FIG. 2 and FIG. 3, and details are not described herein again.

In this embodiment of the present disclosure, the gateway may receive the MQTT publish packets that are sent by the control device on a grouping basis, and send, to the terminals in the group, the application messages carried in the MQTT publish packets, so as to improve message publishing efficiency. The gateway may send the subscription request to the control device, or may forward the subscription request of the terminal to the control device, that is, a subscription mechanism of the gateway and a subscription forwarding mechanism of the gateway are added, so that the subscription mechanism may be more flexible.

Figure 6:
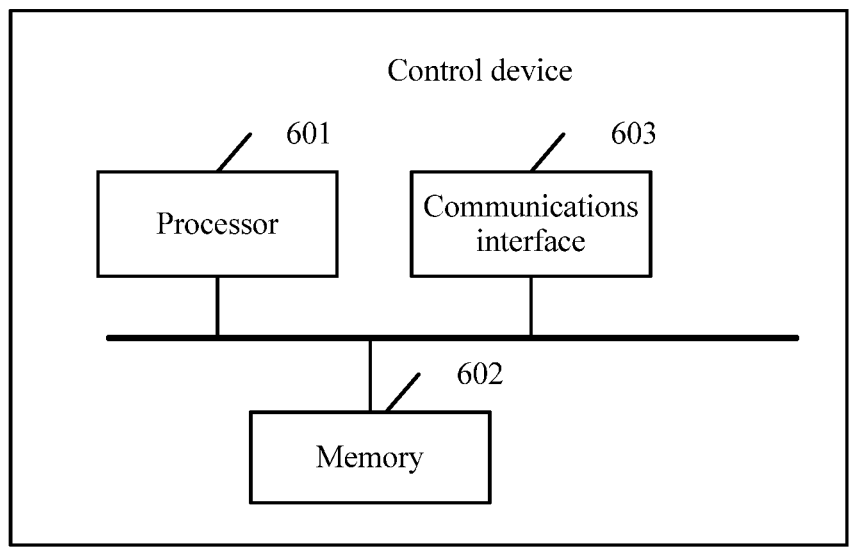
FIG. 6 is a schematic structural diagram of a control device according to an embodiment of the present disclosure.

Based on the foregoing description of a configuration management apparatus, an embodiment of the present disclosure provides a control device. Referring to FIG. 6, the control device may include a processor 601, a memory 602, and a communications interface 603, where the processor 601, the memory 602, and the communications interface 603 are connected to each other by using a bus.

The processor 601 may be one or more central processing units (CPU). When the processor 601 is one CPU, the CPU may be a single-core CPU, or may be a multi-core CPU.

The memory 602 includes but is not limited to a random access memory (RAM), a read-only memory (ROM), an erasable programmable read only memory (EPROM), or a compact disc read-only memory (CD-ROM). The memory 602 is configured to store instructions and data, for example, store an identifier of a gateway connected to the control device.

The communications interface 603 is connected to another network device. For example, the communications interface 603 includes a plurality of interfaces that are respectively connected to a plurality of gateways. The communications interface 603 may be a wired interface, a wireless interface, or a combination thereof. The wired interface may be, for example, an Ethernet interface. The Ethernet interface may be an optical interface, an electrical interface, or a combination thereof. The wireless interface, for example, may be a wireless local area network (WLAN) interface, a cellular network interface, or a combination thereof. The communications interface 603 is configured to receive or send data under the control of the control device, for example, receive an MQTT subscribe packet or send an MQTT publish packet.

The memory 602 is further configured to store program instructions. The foregoing processor 601 may invoke the program instructions stored in the memory 602, so as to implement the configuration management methods shown in the embodiments of this application.

Optionally, the processor 601 in this embodiment of the present disclosure may implement functions of the determining module 401, the obtaining module 402, the query module 403, the generation module 404, the parsing module 407, the recording module 408, the grouping module 409, and the configuration module 410 in FIG. 4. The memory 602 may implement a function of the recording module 408 in FIG. 4. The communications interface 603 may implement functions of the sending module 405 and the receiving module 406 in FIG. 4. This is not limited in this embodiment of the present disclosure.

Based on a same disclosure concept, problem-resolving principles of the control device provided in this embodiment of the present disclosure are similar to those of the method embodiments of the present disclosure. Therefore, for implementations and beneficial effects of the control device, reference may be made to the foregoing method embodiments. For brevity of description, details are not described herein again.

Figure 7:
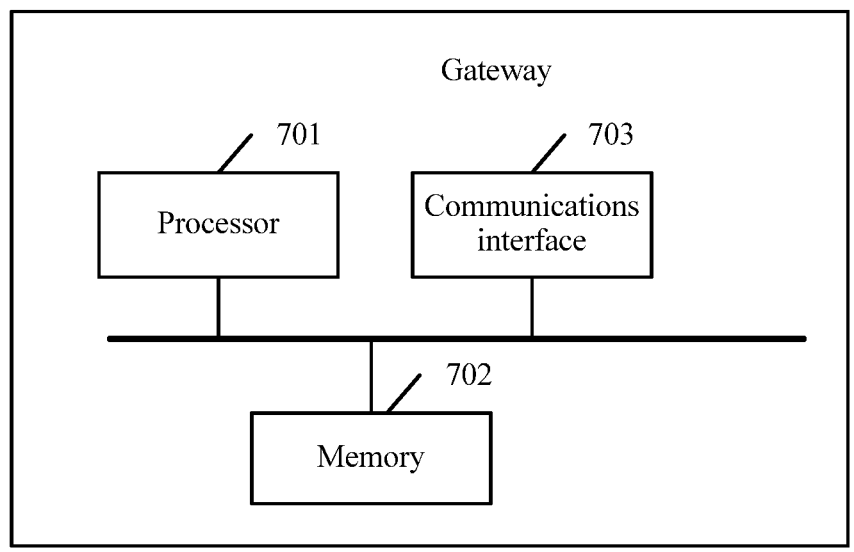
FIG. 7 is a schematic structural diagram of a gateway according to an embodiment of the present disclosure.

Based on the foregoing description of a configuration management apparatus, an embodiment of the present disclosure provides a gateway. Referring to FIG. 7, the gateway may include a processor 701, a memory 702, and a communications interface 703, where the processor 701, the memory 702, and the communications interface 703 are connected to each other by using a bus.

The processor 701 may be one or more CPUs. When the processor 701 is one CPU, the CPU may be a single-core CPU, or may be a multi-core CPU. The processor 701 is configured to control each function module in the gateway and process a signal. The processor 701 may include a modem, configured to perform modulation or demodulation processing on a signal received by the communications interface 703.

The memory 702 includes but is not limited to a RAM, a ROM, an EPROM, and a CD-ROM. The memory 702 is configured to store instructions, an operating system, various applications, and data, for example, store an identifier of a terminal connected to the gateway and a subscription topic of the terminal.

The communications interface 703 is connected to another network device. For example, the communications interface 703 includes a plurality of interfaces that are respectively connected to a plurality of terminals or connected to a control device. The communications interface 703 may be a wired interface, a wireless interface, or a combination thereof. The wired interface may be, for example, an Ethernet interface. The Ethernet interface may be an optical interface, an electrical interface, or a combination thereof. The wireless interface, for example, may be WLAN interface, a cellular network interface, or a combination thereof. The communications interface 703 is configured to receive or send data under the control of the control device, for example, receive an MQTT subscribe packet or send an MQTT publish packet.

The memory 702 is further configured to store program instructions. The foregoing processor 701 may invoke the program instructions stored in the memory 702, so as to implement the configuration management methods shown in the embodiments of this application.

Optionally, the processor 701 in this embodiment of the present disclosure may implement functions of the parsing module 502, the determining module 503, the generation module 504, the obtaining module 507, the first encapsulation module 508, and the second encapsulation module 509 in FIG. 5. The memory 702 may implement a function of the recording module 506 in FIG. 5. The communications interface 703 may implement functions of the receiving module 501 and the sending module 505 in FIG. 5. This is not limited in this embodiment of the present disclosure.

Based on a same disclosure concept, problem-resolving principles of the gateway provided in this embodiment of the present disclosure are similar to those of the method embodiments of the present disclosure. Therefore, for implementations and beneficial effects of the gateway, reference may be made to the foregoing method embodiments. For brevity of description, details are not described herein again.

The present disclosure further provides a computer readable storage medium, and the computer readable storage medium stores a computer program. For implementations and beneficial effects of resolving a problem by the program, reference may be made to the implementations and the beneficial effects of the configuration management methods in FIG. 2 and FIG. 3, and details are not described herein again.

The embodiment of the present disclosure further provides a computer program product, and the computer program product includes a non-volatile computer readable storage medium that stores a computer program; and when the computer program is executed, the computer is enabled to perform the steps of the configuration management method in the embodiments corresponding to FIG. 2 and FIG. 3. For implementations and beneficial effects of resolving a problem by the computer program product, reference may be to the implementations and the beneficial effects of the configuration management methods in FIG. 2 and FIG. 3, and details are not described herein again.

A person of ordinary skill in the art may understand that all or some of the processes of the methods in the embodiments may be implemented by instructing related hardware by a computer program. The program may be stored in a computer readable storage medium. When the program runs, the processes of the methods in the embodiments are performed.

What is claimed is:

1. A configuration management method, applied to a control device and comprising:
   receiving a Message Queuing Telemetry Transport (MQTT) subscribe packet from a gateway, wherein the MQTT subscribe packet carries flag data and a subscription topic;
   recording an identifier of the gateway in a gateway mapping table or recording an identifier of a terminal in an entry corresponding to an identifier of the gateway in a gateway mapping table based on the flag data;
   determining that an application message needs to be published to a target logical group when at least one application message that matches a subscription topic of at least one target terminal in the target logical group is detected or when at least one application message that matches historical behavior data of the at least one target terminal is detected;
   obtaining an identifier of the target logical group;
   querying, according to the gateway mapping table and the identifier of the target logical group, the gateway connected to each of the at least one target terminal, to obtain at least one target gateway, wherein the gateway mapping table records identifiers of a plurality of gateways, an identifier of a terminal connected to each of the plurality of gateways, and an identifier of a logical group to which each terminal belongs;

generating a MQTT publish packet based on the application message, wherein the MQTT publish packet comprises the identifier of the target logical group and the application message; and sending the MQTT publish packet to the at least one target gateway, wherein the MQTT publish packet is used to indicate a target gateway that receives the MQTT publish packet to send a corresponding application message to each target terminal that is connected to the target gateway and that belongs to the target logical group.

2. The configuration management method of claim 1, further comprising:

parsing the MQTT subscribe packet to obtain the flag data;

determining that the subscription topic is subscribed to by the gateway, and recording the identifier of the gateway in the gateway mapping table when the flag data comprises a subscription flag and the identifier of the gateway; or determining that the subscription topic is subscribed to by the terminal, determining that the terminal is connected to the gateway, and recording the identifier of the terminal in the entry corresponding to the identifier of the gateway in the gateway mapping table when the flag data comprises a forwarding flag, the identifier of the terminal, and the identifier of the gateway.

3. The configuration management method of claim 2, wherein before querying, according to the gateway mapping table and the identifier of the target logical group, the gateway connected to each of the at least one target terminal, the configuration management method further comprises:

grouping a plurality of terminals connected to the plurality of gateways based on subscription topics of the plurality of terminals, or randomly grouping the plurality of terminals, or grouping the plurality of terminals based on the plurality of gateways, to obtain a plurality of logical groups;

setting an identifier for each logical group; and recording the identifier of each logical group in an entry corresponding to the identifier of each terminal in the logical group in the gateway mapping table.

4. The configuration management method according to of claim 1, wherein generating a Message Queuing Telemetry Transport MQTT publish packet based on the application message comprises:

generating a variable header in an MQTT format based on the identifier of the target logical group;

generating a payload in the MQTT format based on the application message; and encapsulating the variable header and the payload into the MQTT publish packet.

5. A configuration management method, applied to a gateway and comprising:

receiving a subscription request of a terminal comprising an identifier of the terminal and a subscription topic of the terminal;

recording the identifier of the terminal and the subscription topic of the terminal in an entry of a grouping mapping table based on the subscription request;

receiving a grouping message from a control device, wherein the grouping message comprises the identifier of the terminal and an identifier of a logical group to which the terminal belongs;

recording the identifier of the logical group to which the terminal belongs in an entry corresponding to the identifier of the terminal in the grouping mapping table based on the grouping message;

receiving a first Message Queuing Telemetry Transport (MQTT) publish packet from a control device;

parsing the first MQTT publish packet to obtain an identifier of a target logical group and at least one application message;

obtaining historical behavior data of each target terminal;

recording the historical behavior data of the each target terminal in the entry corresponding to the identifier of the each target terminal in the grouping mapping table;

determining, based on a grouping mapping table and the identifier of the target logical group, at least one target terminal that is connected to the gateway and that belongs to the target logical group, and a subscription topic or the historical behavior data of the each target terminal of the at least one target terminal, wherein the grouping mapping table records an identifier of each terminal that is connected to the gateway, an identifier of a logical group to which each terminal belongs, and a subscription topic or historical behavior data of each terminal;

determining, from the at least one application message, a target application message that matches the historical behavior data or the subscription topic;

generating a second MQTT publish packet based on the target application message; and sending, to the target terminal, the second MQTT publish packet that carries the target application message.

6. The configuration management method of claim 5, further comprising-parsing the subscription request to obtain the identifier of the terminal and the subscription topic of the terminal, and determining that the terminal is connected to the gateway.

7. The configuration management method of claim 6, wherein after determining that the terminal is connected to the gateway, the configuration management method further comprises:

generating a variable header in an MQTT format based on the identifier of the terminal and an identifier of the gateway;

generating a payload in the MQTT format based on the subscription topic of the terminal;

generating a fixed header in the MQTT format based on a forwarding flag; and encapsulating the variable header, the payload, and the fixed header into an MQTT subscribe packet, and sending the MQTT subscribe packet to the control device.

8. The configuration management method according to of claim 5, wherein the method further comprises comprising:

generating a variable header in an MQTT format based on the identifier of the gateway;

generating a payload in the MQTT format based on a subscription topic of the gateway;

generating a fixed header in the MQTT format based on a subscription flag; and encapsulating the variable header, the payload, and the fixed header into the MQTT subscribe packet, and sending the MQTT subscribe packet to the control device.

9. A configuration management apparatus, applied to a control device and comprising:
a memory configured to store computer instructions; and
a processor coupled to the memory and configured to execute the computer instructions that cause the configuration management apparatus to:
receive a Message Queuing Telemetry Transport (MQTT) subscribe packet from a gateway, wherein the MQTT subscribe packet carries flag data and a subscription topic;
record an identifier of the gateway in a gateway mapping table or record an identifier of a terminal in an entry corresponding to the identifier of the gateway in the gateway mapping table based on the flag data;
determine that an application message needs to be published to a target logical group when the application message that matches the subscription topic of the at least one target terminal in the target logical group is detected or when the application message that matches historical behavior data of the at least one target terminal is detected;
obtain an identifier of the target logical group;
query, according to a gateway mapping table and the identifier of the target logical group, the gateway connected to each of the at least one target terminal, to obtain at least one target gateway, wherein the gateway mapping table records identifiers of a plurality of gateways, an identifier of the terminal connected to each of the plurality of gateways, and an identifier of a logical group to which each terminal belongs;
generate a MQTT publish packet based on the application message, wherein the MQTT publish packet comprises the identifier of the target logical group and the application message; and
send the MQTT publish packet to the at least one target gateway, wherein the MQTT publish packet is used to instruct a target gateway that receives the MQTT publish packet to send a corresponding application message to each target terminal that is connected to the target gateway and that belongs to the target logical group.

10. The configuration management apparatus of claim 9, wherein the computer instructions further cause the configuration management apparatus to:
parse the MQTT subscribe packet to obtain the flag data;
determine that the subscription topic is subscribed to by the gateway;
record the identifier of the gateway in the gateway mapping table when the flag data comprises the subscription flag and the identifier of the gateway; and
determine that the subscription topic is subscribed to by the terminal, and determine that the terminal is connected to the gateway, and record the identifier of the terminal in an entry corresponding to the identifier of the gateway in the gateway mapping table when the flag data comprises the forwarding flag, the identifier of the terminal, and the identifier of the gateway.

11. The configuration management apparatus of claim 10, wherein the computer instructions further cause the configuration management apparatus to:
group a plurality of terminals connected to the plurality of gateways based on subscription topics of the plurality of terminals, or randomly group the plurality of terminals, or group the plurality of terminals based on the plurality of gateways, to obtain a plurality of logical groups;
set an identifier for each logical group; and
record the identifier of each logical group in an entry corresponding to the identifier of each terminal in the logical group in the gateway mapping table.

12. The configuration management apparatus of claim 9, wherein the computer instructions further cause the configuration management apparatus to:
generate a variable header in an MQTT format based on the identifier of the target logical group;
generate a payload in the MQTT format based on the application message; and
encapsulate the variable header and the payload into the MQTT publish packet.

13. A configuration management apparatus, applied to a gateway and comprising:
a memory configured to store computer instructions; and
a processor coupled to the memory and configured to execute the computer instructions that cause the configuration management apparatus to:
receive a subscription request of a terminal comprising an identifier of the terminal and a subscription topic of the terminal;
record the identifier of the terminal and the subscription topic of the terminal in an entry of a grouping mapping table based on the subscription request;
receive a grouping message from control device, wherein the grouping message comprises the identifier of the terminal and an identifier of a logical group to which the terminal belongs;
record the identifier of the logical group to which the terminal belongs in an entry corresponding to the identifier of the terminal in the grouping mapping table based on the grouping message;
receive a first Message Queuing Telemetry Transport (MQTT) publish packet from a control device;
parse the first MQTT publish packet to obtain an identifier of a target logical group and at least one application message;
obtain historical behavior data of each target terminal;
record the historical behavior data of the each target terminal in the entry corresponding to the identifier of the each target terminal in the grouping mapping table;
determine, based on a grouping mapping table and the identifier of the target logical group, at least one target terminal that is connected to the gateway and that belongs to the target logical group, and a subscription topic or historical behavior data of the each target terminal, wherein the grouping mapping table records an identifier of each terminal that is connected to the gateway, an identifier of a logical group to which each terminal belongs, and a subscription topic or historical behavior data of each terminal;
determine, from the at least one application message, a target application message that matches the historical behavior data or the subscription topic of the each target terminal;
generate a second MQTT publish packet based on the target application message; and
send, to the target terminal, the second MQTT publish packet that carries the target application message.

14. The configuration management apparatus of claim 13, wherein the computer instructions further cause the configuration management apparatus to:
receive a subscription request of the terminal;
parse the subscription request to obtain an identifier of the terminal and the subscription topic of the terminal;

determine that the terminal is connected to the gateway;

record the identifier of the terminal and the subscription topic of the terminal in an entry of the grouping mapping table;

receive a grouping message from the control device, wherein the grouping message comprises the identifier of the terminal and an identifier of a logical group to which the terminal belongs; and record the identifier of the logical group to which the terminal belongs in an entry corresponding to the identifier of the terminal in the grouping mapping table.

15. The configuration management apparatus of claim 14, wherein the computer instructions further cause the configuration management apparatus to:

generate a variable header in an MQTT format based on the identifier of the terminal and an identifier of the gateway; generate a payload in the MQTT format based on the subscription topic of the terminal; generate a fixed header in the MQTT format based on a forwarding flag;

encapsulate the variable header, the payload, and the fixed header into an MQTT subscribe packet; and send the MQTT subscribe packet to the control device.

16. The configuration management apparatus of claim 13, wherein the computer instructions further cause the configuration management apparatus to:

generate a variable header in an MQTT format based on the identifier of the gateway; generate a payload in the MQTT format based on a subscription topic of the gateway, and generate a fixed header in the MQTT format based on a subscription flag;

encapsulate the variable header, the payload, and the fixed header into the MQTT subscribe packet; and send the MQTT subscribe packet to the control device, wherein the MQTT subscribe packet is used to instruct the control device to determine that the subscription topic is subscribed to by the gateway, and record the identifier of the gateway in the grouping mapping table of the control device.

* * * * *

UNITED STATES PATENT AND TRADEMARK OFFICE
CERTIFICATE OF CORRECTION

PATENT NO. : 11,265,218 B2
APPLICATION NO. : 16/786598
DATED : March 1, 2022
INVENTOR(S) : Hongze Zhu et al.

Page 1 of 1

It is certified that error appears in the above-identified patent and that said Letters Patent is hereby corrected as shown below:

In the Claims

Claim 6, Column 32, Line 37: "comprising-parsing" should read "comprising parsing"

Claim 16, Column 36, Line 10: "gateway, and generate a" should read "gateway; generate a"

Signed and Sealed this
Tenth Day of May, 2022

Katherine Kelly Vidal
*Director of the United States Patent and Trademark Office*